United States Patent
Peng et al.

(10) Patent No.: US 7,330,404 B2
(45) Date of Patent: Feb. 12, 2008

(54) NEAR-FIELD OPTICAL TRANSDUCERS FOR THERMAL ASSISTED MAGNETIC AND OPTICAL DATA STORAGE

(75) Inventors: Chubing Peng, Pittsburgh, PA (US); William Albert Challener, Sewickley, PA (US); Ibrahim Kursat Sendur, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 788 days.

(21) Appl. No.: 10/683,385

(22) Filed: Oct. 10, 2003

(65) Prior Publication Data

US 2005/0078565 A1  Apr. 14, 2005

(51) Int. Cl.
    *G11B 11/00* (2006.01)
(52) U.S. Cl. .............. 369/13.33; 369/13.32; 369/112.27; 360/59
(58) Field of Classification Search .......... 369/13.01, 369/13.13, 13.32, 13.33, 13.56, 101, 112.27; 385/129
    See application file for complete search history.

(56) References Cited

U.S. PATENT DOCUMENTS

| | | | |
|---|---|---|---|
| 4,947,034 A | 8/1990 | Wickramasinghe et al. | |
| 5,199,090 A | 3/1993 | Bell | |
| 5,602,820 A | 2/1997 | Wickramasinghe et al. | |
| 6,055,220 A | 4/2000 | Mamin et al. | |
| 6,275,453 B1 | 8/2001 | Ueyanagi et al. | |
| 6,479,816 B1 | 11/2002 | Oumi et al. | |
| 6,552,966 B1 | 4/2003 | Hasegawa et al. | |
| 6,844,983 B2 * | 1/2005 | Lee et al. ........... | 359/661 |
| 2001/0004348 A1 * | 6/2001 | Ueyanagi ........... | 369/118 |
| 2001/0009541 A1 | 7/2001 | Ueyanagi | |
| 2001/0015937 A1 * | 8/2001 | Yamaguchi et al. ... | 369/13 |
| 2002/0114567 A1 | 8/2002 | Novotny et al. | |
| 2003/0015651 A1 | 1/2003 | Kiguchi et al. | |
| 2003/0072245 A1 | 4/2003 | Ueyanagi | |

(Continued)

FOREIGN PATENT DOCUMENTS

EP          1128372 A2     8/2001

(Continued)

OTHER PUBLICATIONS

J. R. Krenn et al., "Design of Multipolar Plasmon Excitations in Silver Nanoparticles," *Applied Physics Letters*, vol. 77, No. 21, Nov. 20, 2000, pp. 3379-3381.

(Continued)

*Primary Examiner*—Wayne Young
*Assistant Examiner*—Abdukader Muhammed
(74) *Attorney, Agent, or Firm*—Robert P. Lenart, Esq.; Pietragallo Bosick & Gordon, LLP

(57) ABSTRACT

An optical transducer comprises an optical element for directing an electromagnetic wave to a focal region and a metallic nano-structure having a longitudinal axis substantially parallel to an electric field of the electromagnetic wave, the metallic nano-structure being positioned outside of the optical element, wherein the electromagnetic wave produces surface plasmons on the metallic nano-structure. A cladding material having a refractive index differing from the refractive index of the optical element can be positioned adjacent to a surface of the metallic nano-structure. Magneto-optical recording heads that include the transducers and disc drives that include the magneto-optical recording heads are also included.

22 Claims, 17 Drawing Sheets

U.S. PATENT DOCUMENTS

| | | | |
|---|---|---|---|
| 2003/0123334 A1* | 7/2003 | Fujimaki et al. | 369/13.23 |
| 2003/0128452 A1 | 7/2003 | McDaniel et al. | |
| 2003/0128635 A1* | 7/2003 | Ruigrok et al. | 369/13.55 |
| 2003/0147616 A1* | 8/2003 | Dickson et al. | 385/129 |
| 2004/0001394 A1* | 1/2004 | Challener et al. | 369/13.32 |
| 2005/0052771 A1* | 3/2005 | Rausch et al. | 360/59 |

FOREIGN PATENT DOCUMENTS

| | | |
|---|---|---|
| EP | 1148370 A2 | 10/2001 |
| EP | 1148370 A3 | 10/2001 |
| JP | 2001-256664 | 9/2001 |
| JP | 2001256664 | 9/2001 |
| JP | 2002-008235 | 1/2002 |
| WO | WO 02/063613 A3 | 8/2002 |

OTHER PUBLICATIONS

C. L. Jahncke et al., "Raman Imaging With Near-Field Scanning Optical Microscopy", *Appl. Phys. Lett.*, vol. 67, No. 17, 1995, pp. 2483-2485.

O. J. F. Martin et al., "Controlling and Tuning Strong Optical Field Gradients at a Local Probe Microscope Tip Apex", *Appl. Phys. Lett.*, vol. 70, No. 6, Feb. 10, 1997, pp. 705-707.

E. J. Sanchez et al., "Near-Field Fluorescence Microscopy Based on Two-Photon Excitation With Metal Tips", *Physical Review Letters*, vol. 82, No. 20, May 17, 1999, pp. 4014-4017.

T. D. Milster et al., "Roles of Propagating and Evanescent Waves in Solid Immersion Lens Systems", *Applied Optics*, vol. 38, No. 23, Aug. 10, 1999, pp. 5046-5057.

K. Ueyanagi et al., "Proposal of a Near-Field Optical Head Using a New Solid Immersion Mirror", *Jpn. J. Appl. Phys.*, vol. 39, Part 1, No. 2B, Feb. 2000, pp. 888-891.

A. V. Zayats et al., "Apertureless Scanning Near-Field Second-Harmonic Microscopy", *Optics Communciations*, vol. 178, May 1, 2000, pp. 245-249.

S. Quabis et al., "Focusing Light to a Tighter Spot", *Optics Communications*, vol. 179, May 25, 2000; pp. 1-7.

M. A. Lieb et al., "A High Numerical Aperture Parabolic Mirror as Imaging Device For Confocal Microscopy", *Optics Express*, vol. 8, No. 7, Mar. 26, 2001, pp. 458-474.

T. E. Schlesinger et al., "An Integrated Read/Write Head For Hybrid Recording", *Jpn. J. Appl. Phys.*, vol. 41, Part 1, No. 3B, Mar. 2002, pp. 1821-1824.

* cited by examiner

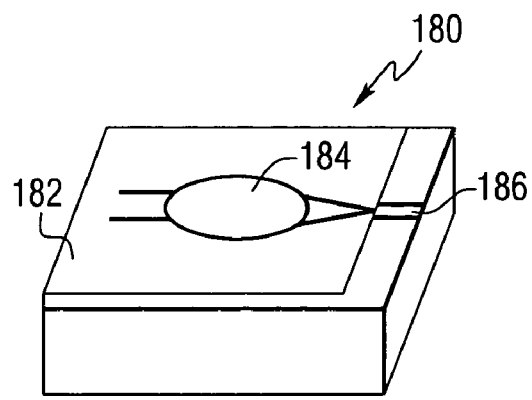 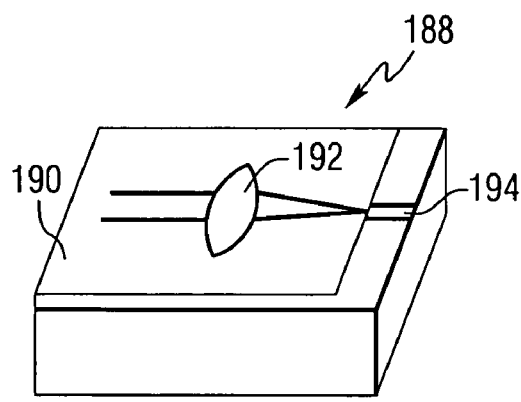
*FIG. 20*    *FIG. 21*
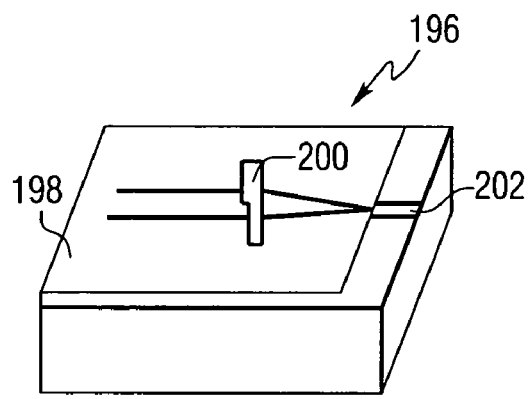
*FIG. 22*
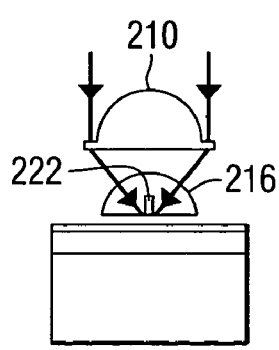 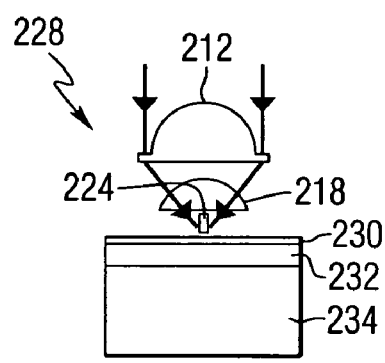 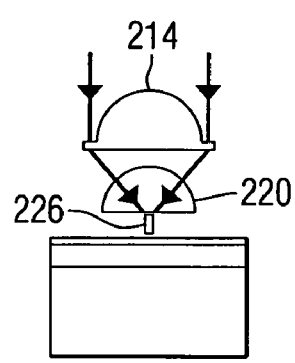
*FIG. 23*    *FIG. 24*    *FIG. 25*

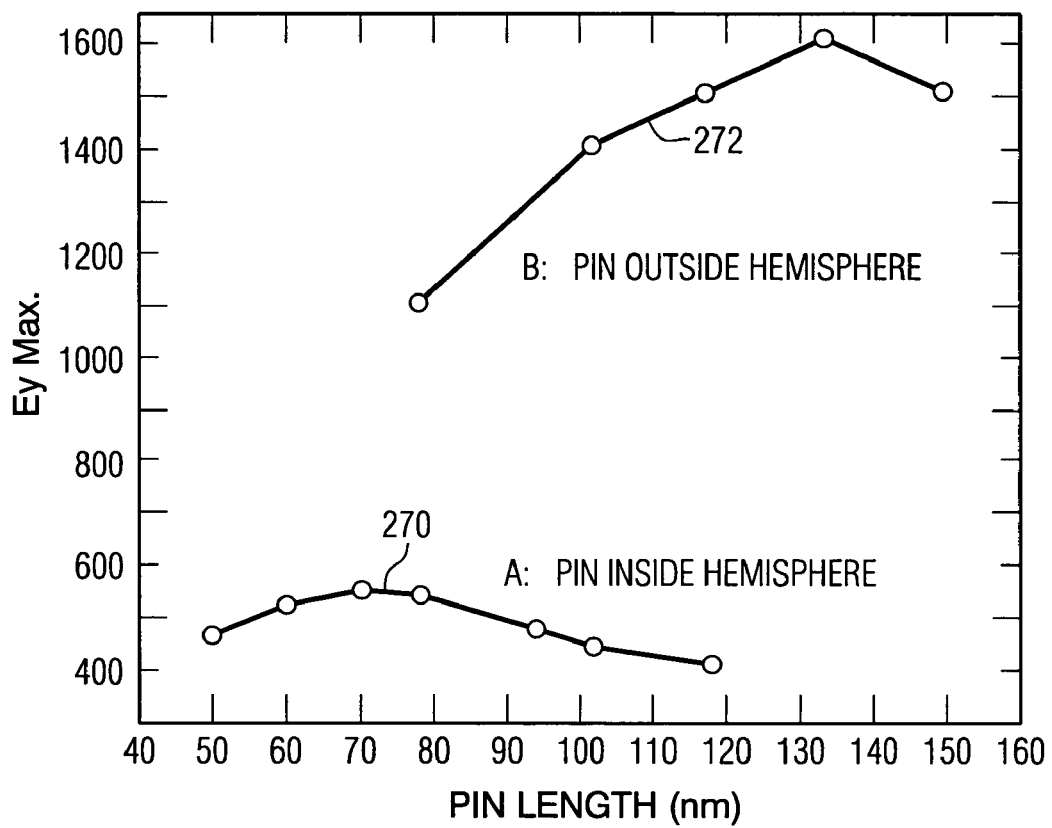
FIG. 30
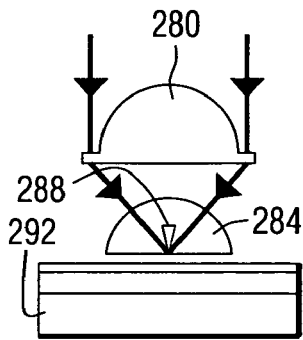
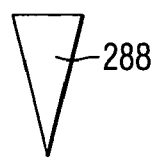
FIG. 31A
FIG. 31B
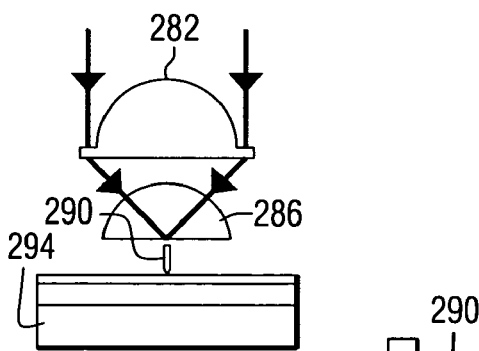
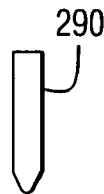
FIG. 32A
FIG. 32B

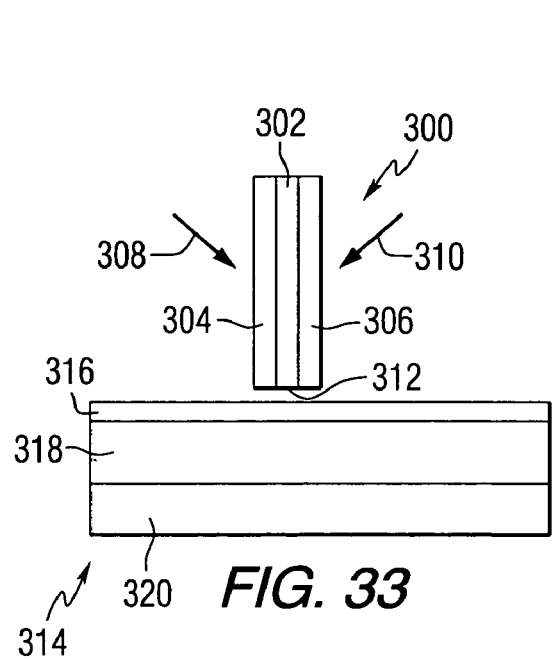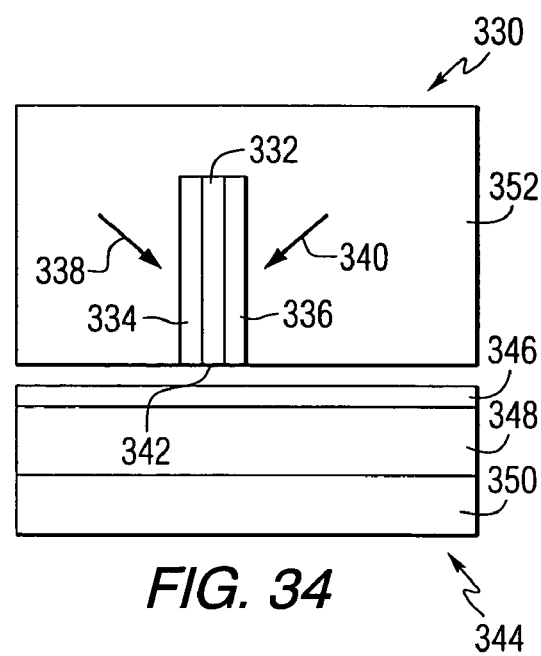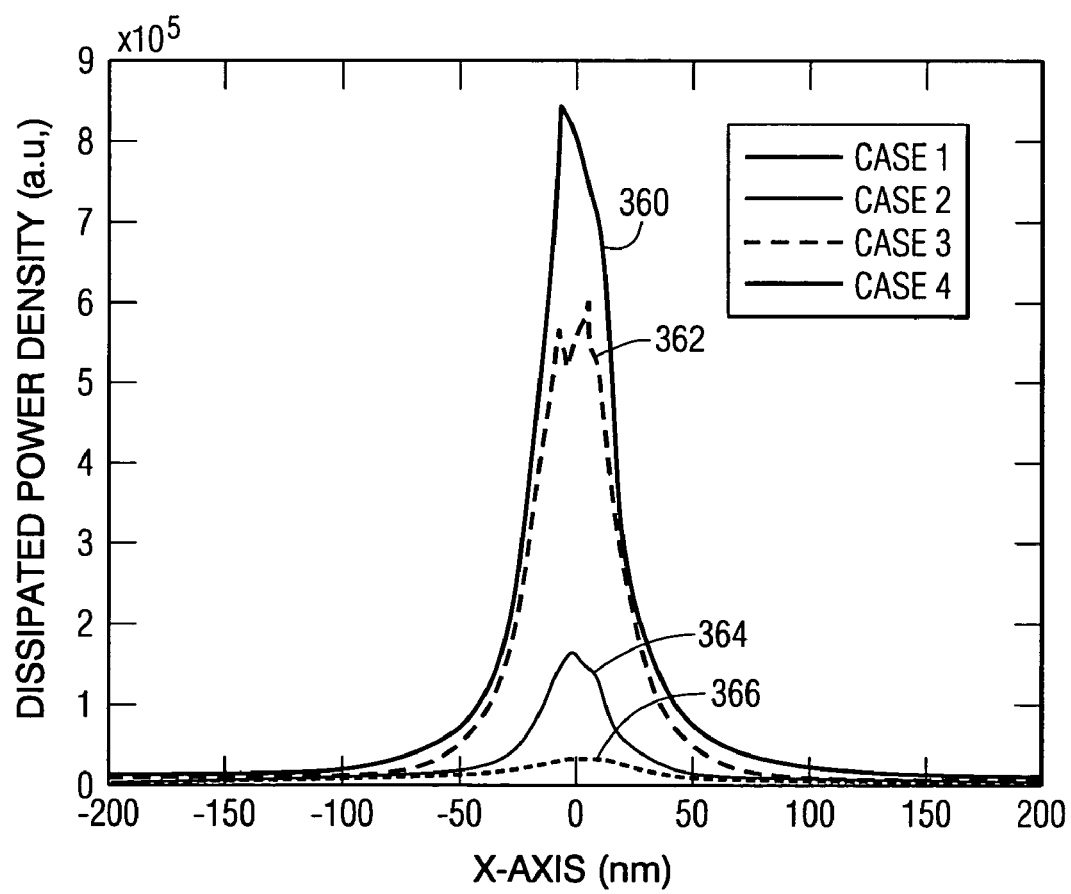

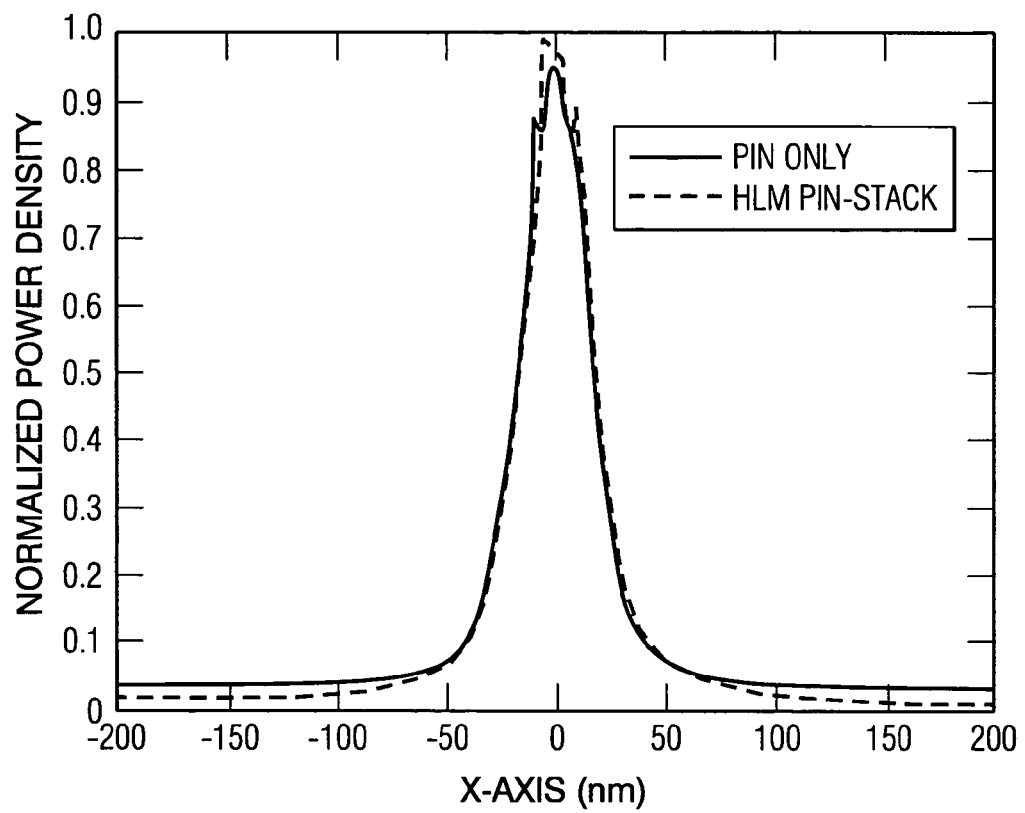
FIG. 44
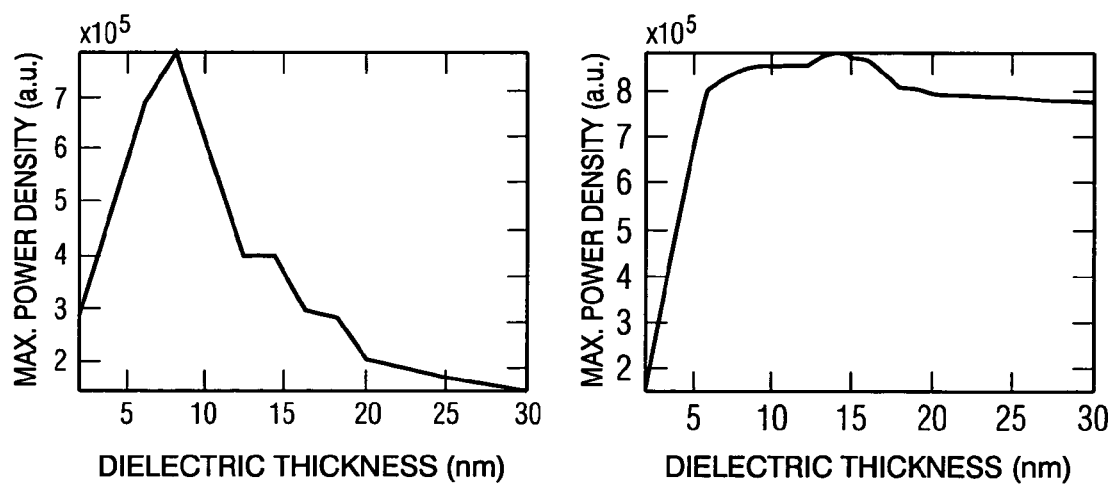
FIG. 45
FIG. 46

NEAR-FIELD OPTICAL TRANSDUCERS FOR THERMAL ASSISTED MAGNETIC AND OPTICAL DATA STORAGE

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to optical transducers, and more particularly to optical transducers that can be used in optical recording and thermally assisted magnetic recording.

BACKGROUND OF THE INVENTION

In thermally assisted optical/magnetic data storage, information bits are recorded on a layer of a storage medium at elevated temperatures, and the heated area in the storage medium determines the data bit dimension. In one approach, an electromagnetic wave in the form of light is used to heat the storage medium. To achieve high areal data density, it is preferred to have a high light throughput to an optical spot well below the diffraction limit to heat the storage layer of the medium. Some prior systems have confined the light to a small spot but did not deliver a reasonable amount of optical power to the storage medium.

Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability. Heat assisted magnetic recording can be applied to any type of magnetic storage media, including tilted media, longitudinal media, perpendicular media and patterned media.

Heat assisted magnetic recording requires an efficient technique for delivering large amounts of light power to the recording medium confined to spots of, for example, 50 nm or less. Areal density and bit aspect ratio are among the factors which determine this size. Based on previous studies, 1 Tb/in$^2$ requires spots of 25 nm. A variety of transducer designs have been proposed and some have been experimentally tested. Among these are metal coated glass fibers and hollow pyramidal structures with metal walls. For all these approaches, confinement of the light depends on an aperture which is fabricated at the end of the structure and gives this kind of transducer the name "aperture probes." Generally these devices suffer from very low light transmission rendering the devices useless for HAMR recording. For example, tapered and metallized optical fibers have demonstrated light confinement down to approximately 50 nm with a throughput efficiency of 10$^{-6}$. Pyramidal probes made from anisotropic etching of Si wafers have been designed with throughput efficiencies of 10$^{-4}$ for similar spot sizes. Although this is the state of the art, it is still about two orders of magnitude too small for HAMR.

Improvements in throughput efficiency have been achieved for these transducers by changing the taper angles, filling the hollow structures with high index materials, and trying to launch surface plasmons (SP) on integrated edges and corners of these tip-like structures. Although doing so does increase the throughput to some extent, the most promising SP approach is still very inefficient due to a lack of an efficient SP launching technique. In addition, all aperture probes suffer from a lower limit on spot size which is twice the skin depth of the metal film used to form the aperture. Even for aluminum, the metal with the smallest skin depth for visible light, this corresponds to a spot size of ~20 nm.

Solid immersion lenses (SILs) and solid immersion mirrors (SIMs) have also been proposed for concentrating far field optical energy into small spots. The optical intensity is very high at the focus but the spot size is still determined by the diffraction limit which in turn depends on the refractive index of the material from which the SIL or SIM is made. The smallest spot size which can be achieved with all currently known transparent materials is ~60 nm, which is too large for HAMR.

A metal pin can be used as a transducer to concentrate optical energy into arbitrarily small areal dimensions. In previously proposed designs that utilize a relatively long cylindrical metal pin located at a focal point, the pin supports a surface plasmon mode which propagates along the pin, and the width of the external electric field generated by the surface plasmon mode is proportional to the diameter of the pin.

There is a need for transducers that can provide a reduced spot size and increased throughput efficiencies.

SUMMARY OF THE INVENTION

An optical transducer comprises means for directing an electromagnetic wave to a focal region and a metallic nano-structure having a longitudinal axis substantially parallel to an electric field of the electromagnetic wave, the metallic nano-structure being positioned outside of the means for directing an electromagnetic wave, wherein the electromagnetic wave produces surface plasmons on the metallic nano-structure.

The invention also encompasses an optical transducer comprising means for directing an electromagnetic wave to a focal region, the means for directing an electromagnetic wave having a first index of refraction, a metallic nano-structure positioned at the focal region, and a cladding material having a second refractive index positioned adjacent to a surface of the metallic nano-structure.

Magneto-optical recording heads that include the transducers and disc drives that include the magneto-optical recording heads are also included.

BRIEF DESCRIPTION OF THE DRAWINGS

FIGS. 20, 21 and 22 are isometric views of various lens structures that can be used in the transducers of this invention.

FIGS. 23, 24 and 25 are schematic representations of transducers used to illustrate the operation of the transducers of this invention.

FIG. 30 is a graph of data illustrating simulated performance of the transducers of this invention.

FIGS. 31 and 32 are schematic representations of transducers used to illustrate the operation of the transducers of this invention.

FIGS. 33 and 34 are a schematic representations of portions of transducers constructed in accordance with the invention.

FIG. 35 is a graph of data illustrating simulated performance of the transducers of FIGS. 33 and 34.

FIG. 44 is a graph of the normalized power distribution for two sensor configurations.

FIGS. 45 and 46 are graphs showing the effect of dielectric thickness in the transducers.

DETAILED DESCRIPTION OF THE INVENTION

Figure 1:
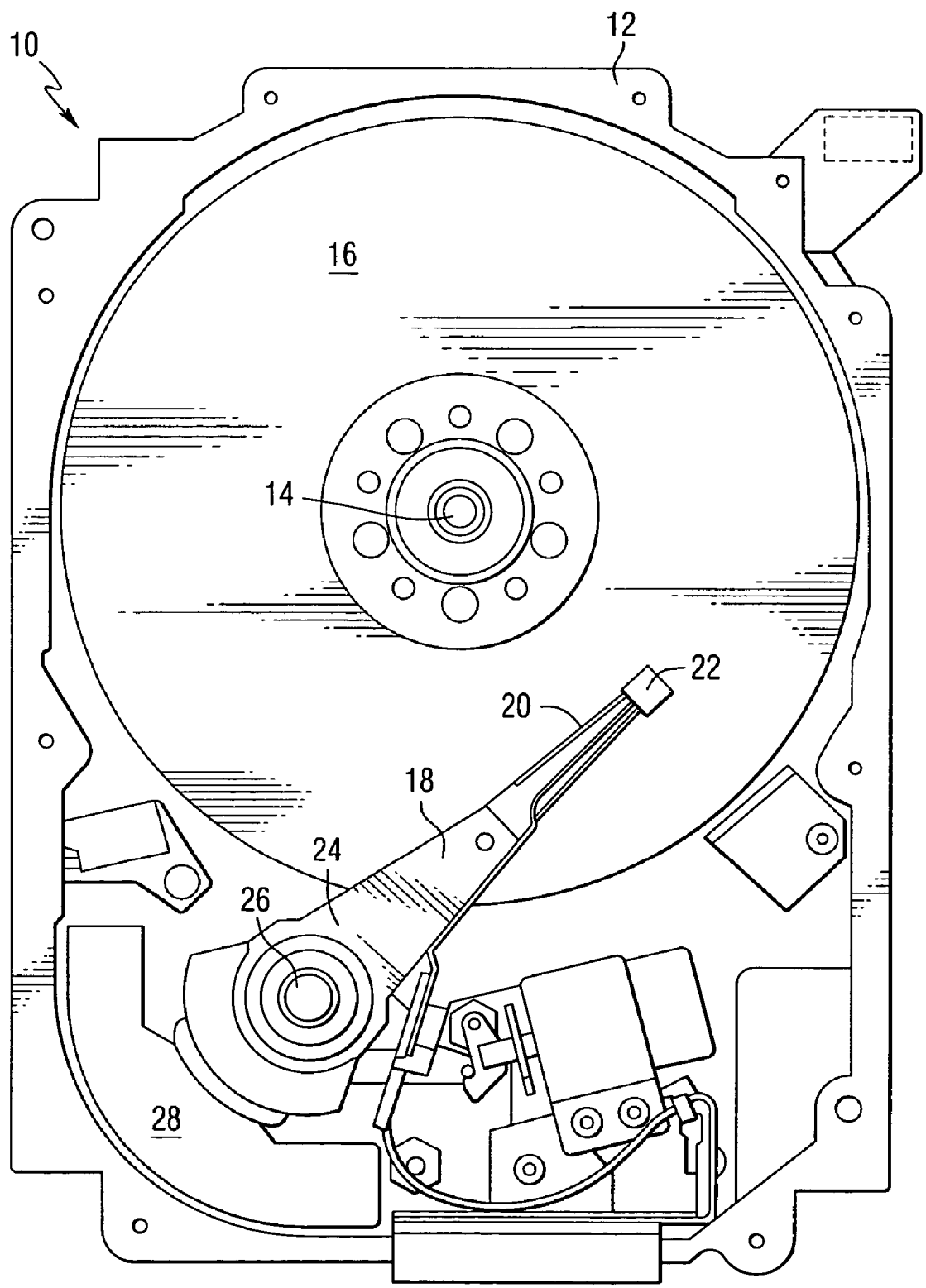
FIG. 1 is a pictorial representation of a magnetic disc drive that can include magnetic heads constructed in accordance with this invention.

This invention encompasses transducers that can be used in magnetic and optical recording heads for use with magnetic and/or optical recording media, as well as magnetic and/or optical recording heads that include such devices and disc drives that include the recording heads. FIG. 1 is a pictorial representation of a disc drive 10 that can utilize recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

For heat assisted magnetic recording, an electromagnetic wave of, for example visible, infrared or ultraviolet light, is directed onto a surface of a data storage medium to raise the temperature of a localized area of the medium to facilitate switching of the magnetization of the area. Well-known solid immersion lenses (SILs) have been proposed for use in reducing the size of a spot on the medium that is subjected to the electromagnetic radiation. In addition, solid immersion mirrors (SIMs) have been described in the literature and proposed for use in heat assisted magnetic recording heads. SILs and SIMs may be either 3-dimensional or 2-dimensional. Planar waveguides that include focusing means such as mode index lenses and mirrors can also be used to concentrate the electromagnetic wave. All of these structures can serve as means for concentrating an electromagnetic wave to a focal region. A nano-structure, such as a metallic pin, can be positioned near the focal region to guide the electromagnetic wave to the surface of a recording medium. This invention provides an efficient means of coupling an electromagnetic wave to a nano-structure, such as a metallic pin.

Figure 2:
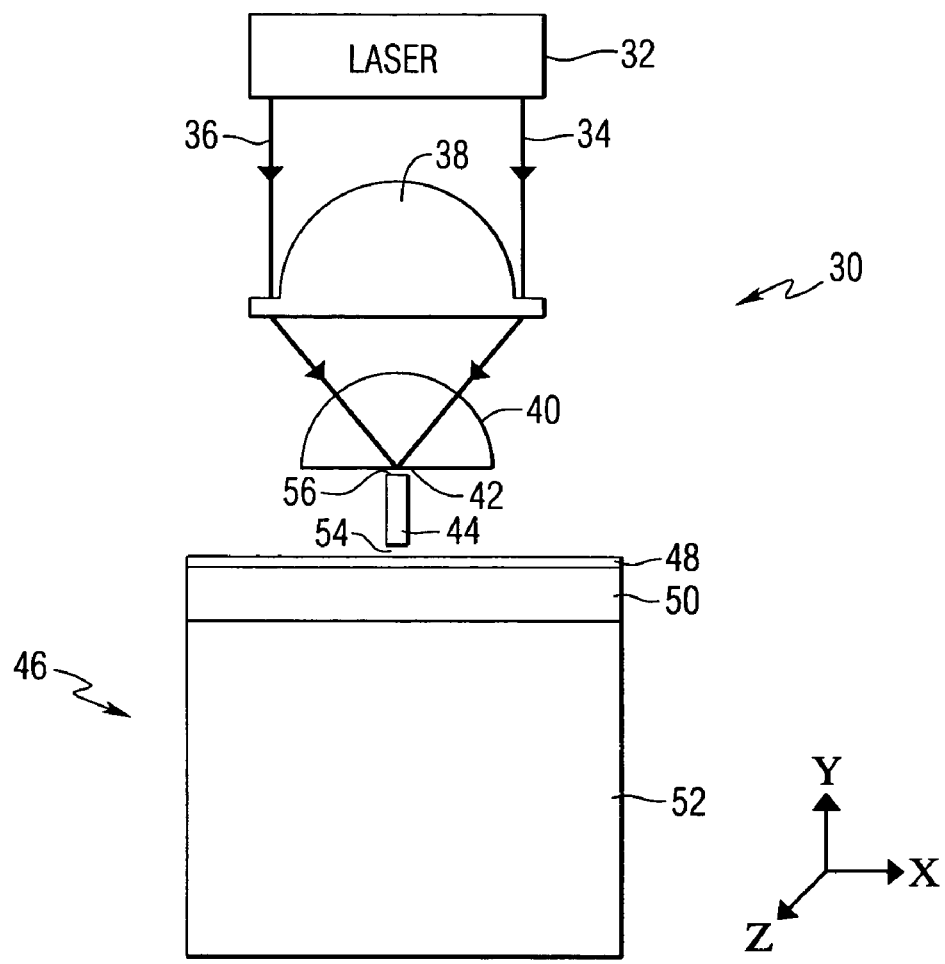
FIG. 2 is a schematic representation of a transducer constructed in accordance with this invention.

FIG. 2 is a schematic representation of a transducer 30 constructed in accordance with this invention. A source of electromagnetic radiation, such as a laser 32 produces a radially polarized beam of light illustrated by arrows 34 and 36 that is delivered to an objective lens 38. A solid hemispheric lens 40 receives the light and concentrates it to a focal region 42. A nano-structure 44 in the form of an elongated metallic nano-wire, also called a pin, is positioned near the focal region. The light, having unit power over the lens aperture, is brought to focus onto the center of the hemisphere by the objective lens, and illuminates the metallic pin. A magnetic storage medium 46, including a storage layer 48, which can be a 12 nm thick layer of a cobalt alloy or multilayer of cobalt and/or iron, a heat-sink layer 50, which can be a 100 nm thick gold layer, and a substrate 52, is placed below the transducer. One end of the transducer can be separated from the surface of the storage medium by an air gap of, for example, 10 nm. In one example the numerical aperture of the objective lens is 0.85, and the refractive index of the solid hemisphere is 2.09. The end of the nano-structure is separated from the solid hemispheric lens 40 by a gap 56. The length of gap 56 should be less than 50 nm. The electric field within the lens is coupled evanescently across the bottom surface of the lens into the nano-structure. For the calculated data in this description, the optical properties of cobalt were used to simplify the calculations.

In FIG. 2, X, Y, Z are three axes of a right-handed Cartesian coordinate system. The origin of the coordinate system (x, y, z)=(0,0,0) is at the center of the bottom surface of the solid hemisphere, which is also the focal point.

Figure 3A:
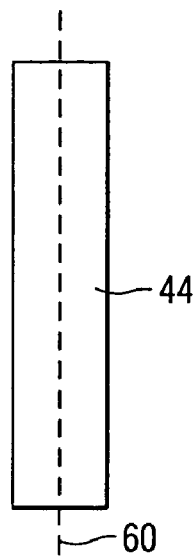
FIGS. 3a and 3b are side elevation views of metallic nano-structures that can be used in the transducers of this invention.
Figure 3B:
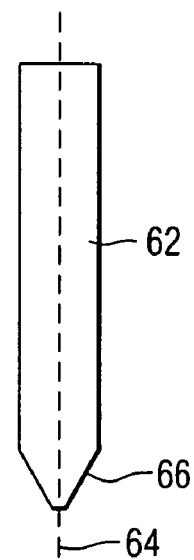

The operation of the transducer has been simulated for transducers wherein the nano-structure comprises a gold pin or a silver pin. The gold pin used for the simulation is 48 nm wide along the x-axis and 48 nm wide along the z-axis. The end closest to the storage layer may be flat or pointed. FIG. 3a shows a pin 44 having a longitudinal axis 60 and a square cross-sectional shape in a plane perpendicular to the longitudinal axis. FIG. 3b shows a pin 62 having a longitudinal axis 64, a square cross-sectional shape in a plane perpendicular to the longitudinal axis, and a tapered end 66. In the simulation it was assumed that the light used to illuminate the pin has a wavelength of 833 nm, the complex refractive index is 0.188+j 5.89 for the gold pin, and the complex refractive index is 2.53+j 4.88 for the storage medium, which is similar to cobalt.

Figure 4:
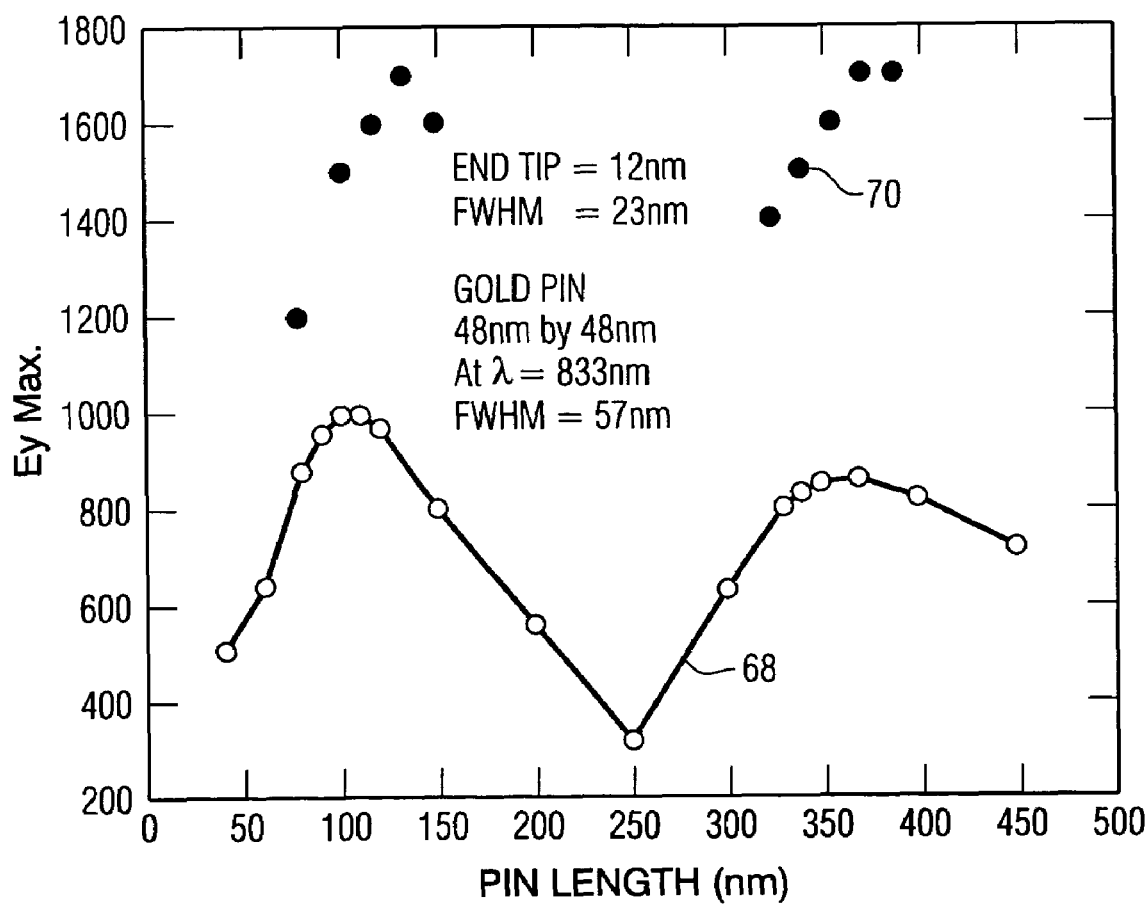
FIGS. 4, 5, 6 and 7 are graphs of data illustrating simulated performance of the transducers of this invention.

FIG. 4 displays the calculated magnitude of the y-component of the vector E-field ($|E_y|$) of the light versus pin length at the location (x, z)=(0,0) and 7.5 nm below the end of the pin as a function of pin length. In FIG. 4, line 68 represents data for the flat end pin and dots 70 represent data for the pointed end pin. The magnitude of $|E_y|$ displayed in FIG. 4 has been multiplied by the light wavelength. It is evident that the magnitude of $|E_y|$ varies with pin length. At certain pin lengths the gold pin reaches resonance and $|E_y|$ is maximized. Compared to the E-field at the center of the focal-plane in the absence of the pin and storage medium, $|E_y|$ is enhanced by a factor of 12 for the flat-end pin, and by a factor of 20 for the pointed-end pin.

The cross-sectional E-field distribution at a distance of 7.5 nm below the pin has been calculated for a gold pin 48 nm×48 nm×100 nm long with a flat end and for a gold pin 48 nm×48 nm×374 nm long with a pointed end. For the flat-end pin, the light is confined to a spot of full-width at half-maximum (FWHM)=58 nm. For the pointed pin, the FWHM spot size is 23 nm. The E-field near the tip of the pin in the XY plane is enhanced and confined. The peak field strength at the end of the pin (y=−384 nm) is ~900 times stronger than without the pin.

Figure 5:
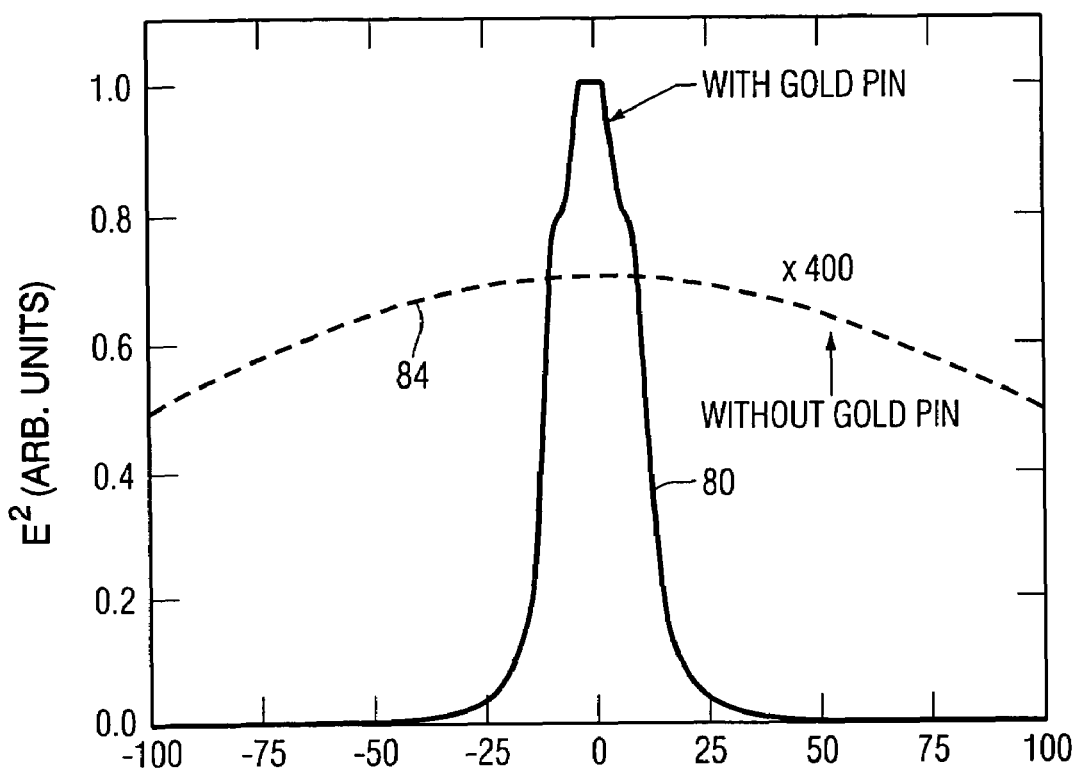
Figure 6:
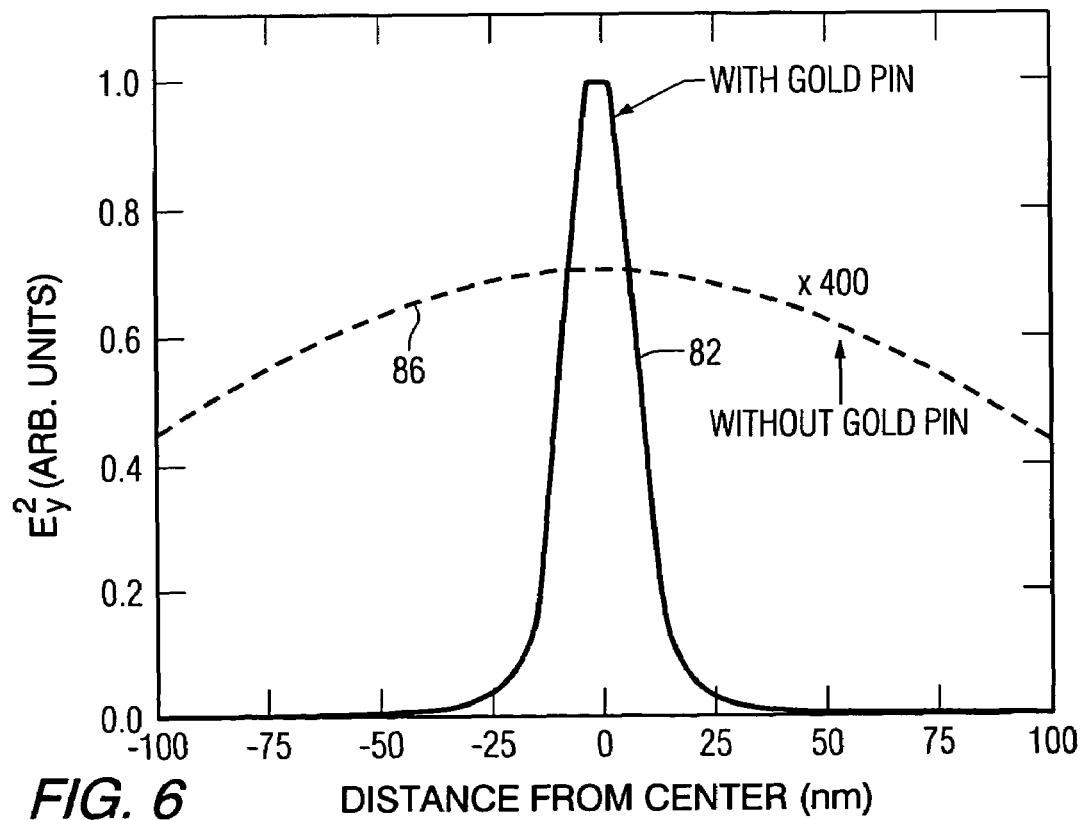

FIG. 5 shows the calculated E-field strength, $E^2(=|E_x|^2+|E_y|^2+|E_z|^2)$, and FIG. 6 shows the calculated E-field in the y direction, $|E_y|^2$. Solid lines 80 and 82 represent the field strength with a gold pin, which are evaluated at 2.5 nm below the gold pin, while the dashed lines 84 and 86 represent the fields at the focal-plane when the metal pin and storage media are absent. The gold pin dimensions were 48 nm×48 nm×374 nm.

For thermally assisted magnetic/optical data storage, a reasonable amount of optical power must be delivered to the storage medium to raise the temperature of the storage medium significantly for writing. For this purpose, the temperature rise at the surface of the storage medium has been estimated. For this simulation, it was assumed that the storage medium was homogeneous and continuous and that the substrate was flat. There was 10 nm air gap between the end of the pin and the surface of the medium. It was also assumed that the optical properties (the index of refraction) and thermal coefficients (the specific heat C and thermal conductivity K) of all materials involved, including the solid hemisphere, the gold pin, the 12 nm storage layer, the 100 nm gold heat-sink layer, and the substrate, are temperature-independent. Heat flow from the gold pin to the storage media was not taken into account in the thermal calculation. It was assumed that the specific heat was C=2 joule/cm³/° C. for all the materials. The assumed thermal conductivities, K, were K=0.1 watt/cm/° C. for the storage layer, which is about one-tenth of bulk value, K=3 watt/cm/° C. for the gold heat-sulk layer, and K=0.1 watt/cm/° C. for the substrate.

The peak temperature rise ($\Delta T$) at the surface of the storage layer illuminated by the laser has been calculated for 2 ns illumination duration. The optical power input to the transducer was 10 mW. Similar to what was observed in the E-field, the temperature rise $\Delta T$ also varies with pin length. At resonance, $\Delta T$=40° C.

Figure 7:
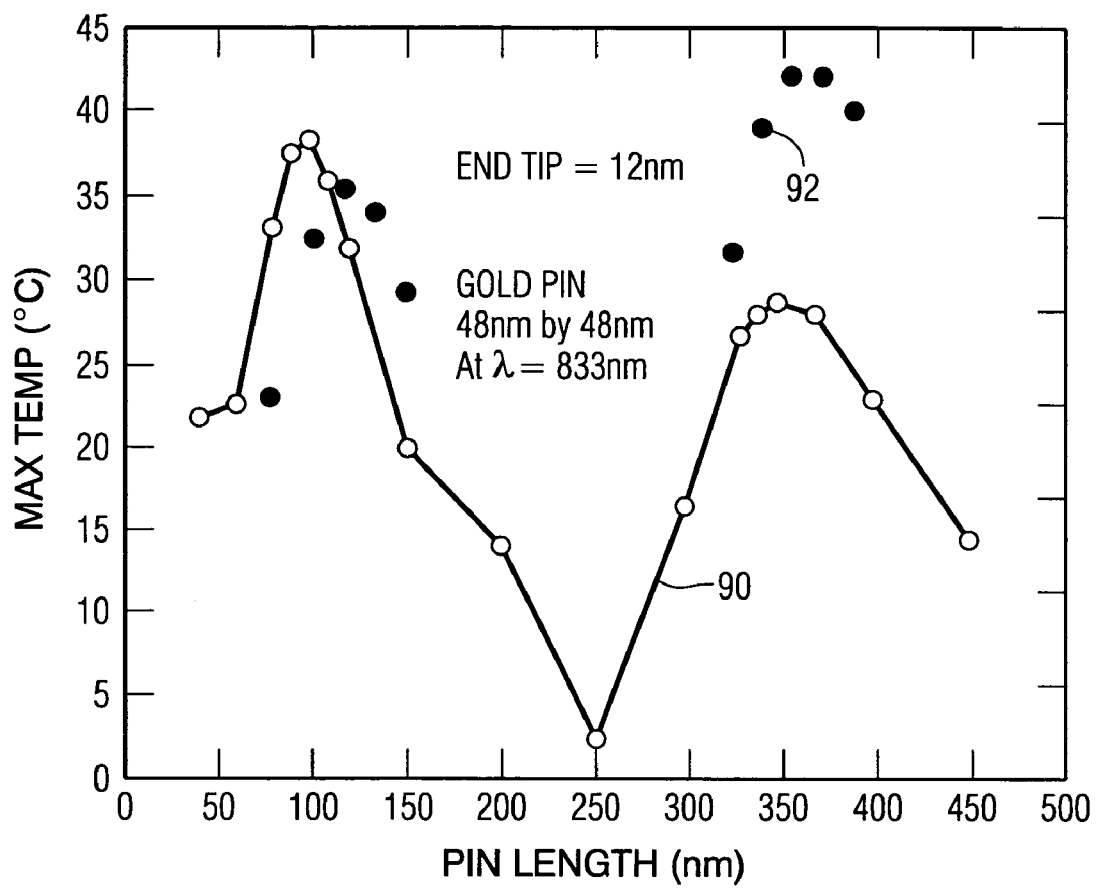

FIG. 7 shows the calculated peak temperature rise at the surface of the storage layer under illumination of a 10 mW laser output for 2 ns duration of illumination as a function of gold pin length for a flat-end pin, illustrated by line 90, and for a pointed-end pin, illustrated by dots 92. In the calculation it was assumed that the storage layer was homogeneous and continuous and that the substrate was flat.

The E-field distribution at a 2.5 nm distance below the surface of the cobalt film was also calculated for a gold pin, 374 nm long with a pointed tip. Compared to the E-field distribution at 2.5 nm above the storage layer shown in FIG. 6, the $E_x$ and $E_z$ become much broader but $E_y$ is still confined. In terms of magnitude, $E_x$ and $E_z$ inside the film are about one-tenth of that in the air-gap above the storage layer, and $E_y$ is only about one-fortieth of that in the air gap. Since the E-field above the storage layer is almost perpendicular to the film's surface, the light is not efficiently coupled into the storage layer. If the y component of the field could be coupled into the recording medium as efficiently as the x and z components, then we would expect a temperature rise $\Delta T$ of ~$(40/10)^2$×43° C.=688° C.

Figure 8:
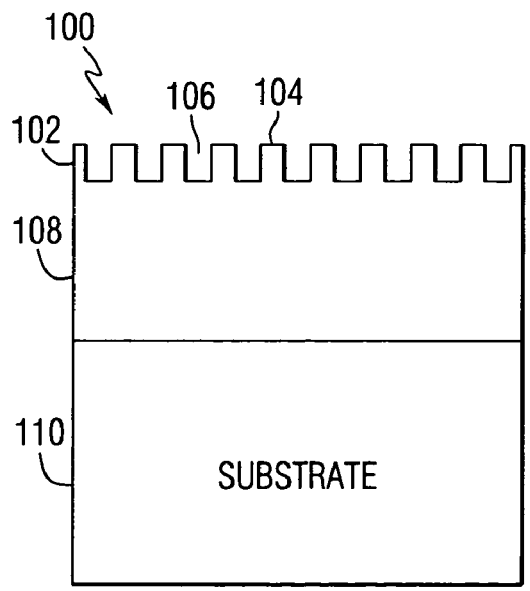
FIG. 8 is a side view of a portion of a patterned data storage medium that can be used in combination with the transducers of this invention.
Figure 9:
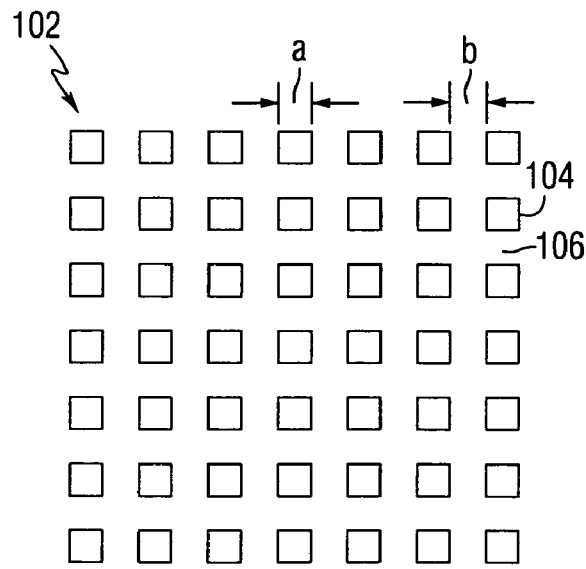
FIG. 9 is a top plan view of the data storage medium of FIG. 8.

One of the ways to efficiently couple the E-field into the storage layer is by using patterned media 100, as shown in FIGS. 8 and 9, instead of continuous media as was previously considered. The storage layer 102 is comprised of granular islands 104, separated by a dielectric material 106, for instance, free-space. Each granule has a size (a×a) in the XZ plane. The separation between granules is a distance b. The storage layer is positioned on a heat sink 108, which is positioned on a substrate 110.

The E-field distribution at a distance 2.5 nm below the surface of the storage layer for a granule size a=12 nm and an air separation b=24 nm, has been calculated when the transducer is positioned above one of the granules. The thermal calculation did not include the low thermal diffusion of the air between grains, but rather assumed that the air between the grains has the same thermal coefficient as that of the cobalt storage layer. Using the patterned media of FIGS. 8 and 9, the temperature in the storage layer is confined to the granule underneath the pin and the peak temperature rise is calculated to be 650° C., which is consistent with the previous simple estimate of 688° C.

The performance of the transducer has also been simulated with silver pins that are 25 nm wide along the x-axis and 25 nm wide along the z-axis. Both ends of the pin are flat. The light wavelength was $\lambda$=826.6 nm, and the complex refractive index was n=0.145+j 5.5 for the silver pin.

Figure 10:
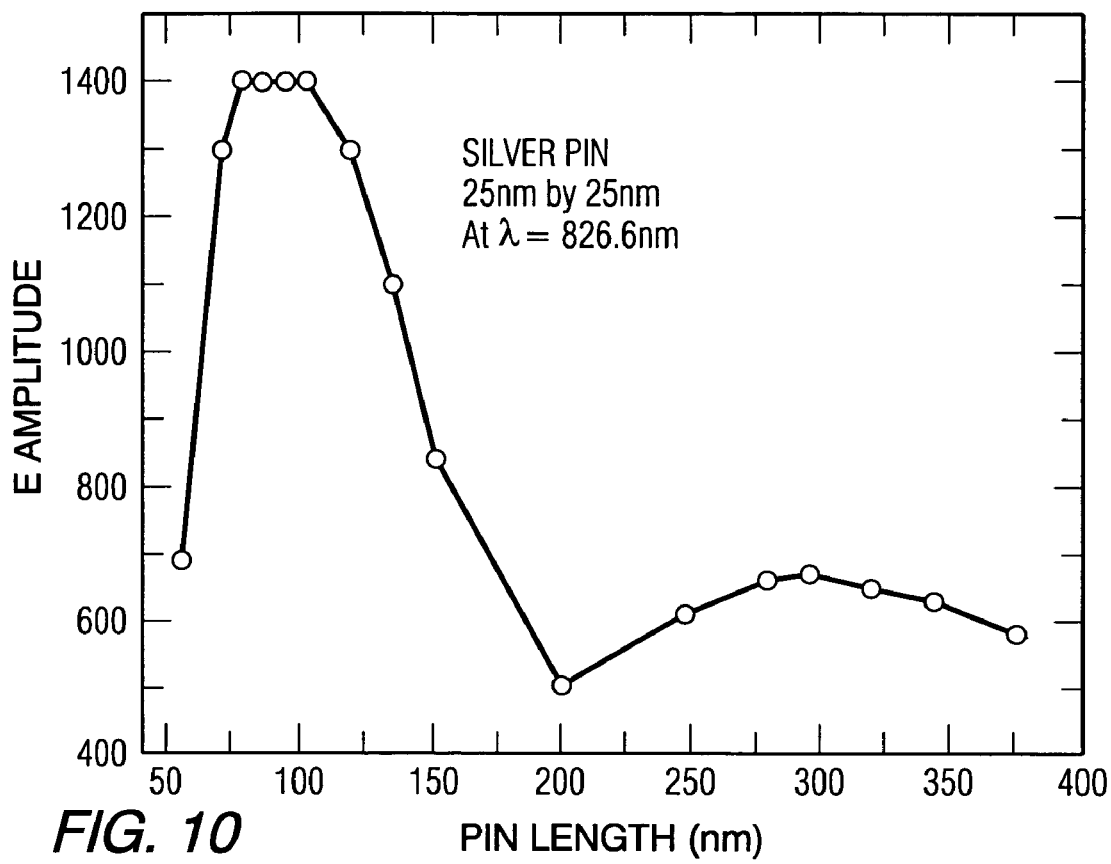
FIGS. 10, 11, 12 and 13 are graphs of data illustrating simulated performance of the transducers of this invention.

FIG. 10 shows the calculated $|E_y|$ at (x, z)=(0, 0) and 7.5 nm below the end of the pin as a function of pin length. It is evident that the magnitude of $|E_y|$ varies with pin length. At pin lengths of 96 nm and 300 nm, the silver pin reaches resonance and the $|E_y|$ magnitude is maximized. The E-field strength with a pin length of 300 nm is much weaker than that with a pin length of 96 nm, differing from the case of the gold pin, due to the different pin size. Compared to the E-field at the focal-plane in the absence of the pin and storage media, the E-field is enhanced by a factor of 16.

Figure 11:
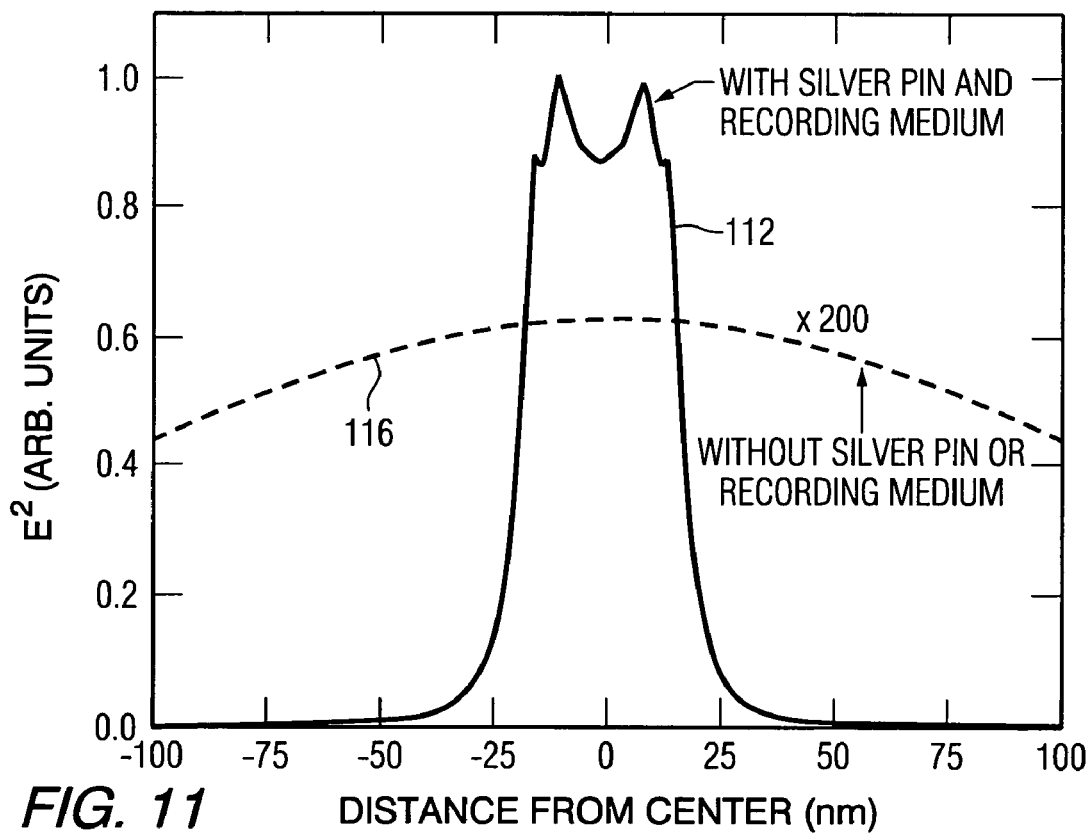
Figure 12:
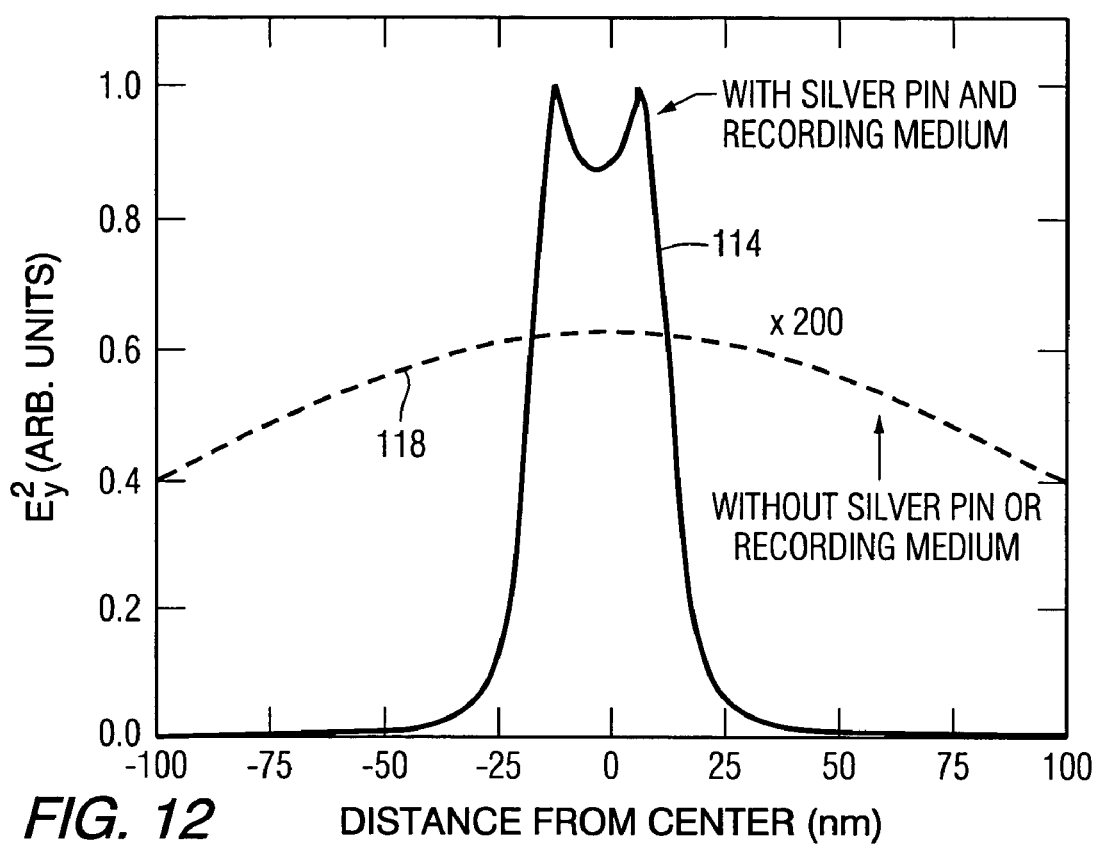

FIGS. 11 and 12 show the calculated magnitude of the enhancement of E-field strength: $E^2(=|E_x|^2+|E_y|^2+|E_z|^2)$ and $|E_y|$. In FIGS. 11 and 12, the solid lines 112 and 114 represent the field strength with a silver pin and storage medium, which were evaluated at 2.5 nm below the silver pin, while the dashed lines 116 and 118 represent the fields at the focal plane without the metal pin or storage medium. The silver pin was assumed to have dimensions of 25 nm×25 nm×96 nm, with both ends being flat. The E-field strength with the pin is ~330 times stronger than that without a pin and the maximum E-field does not occur at the center of the pin.

Figure 13:
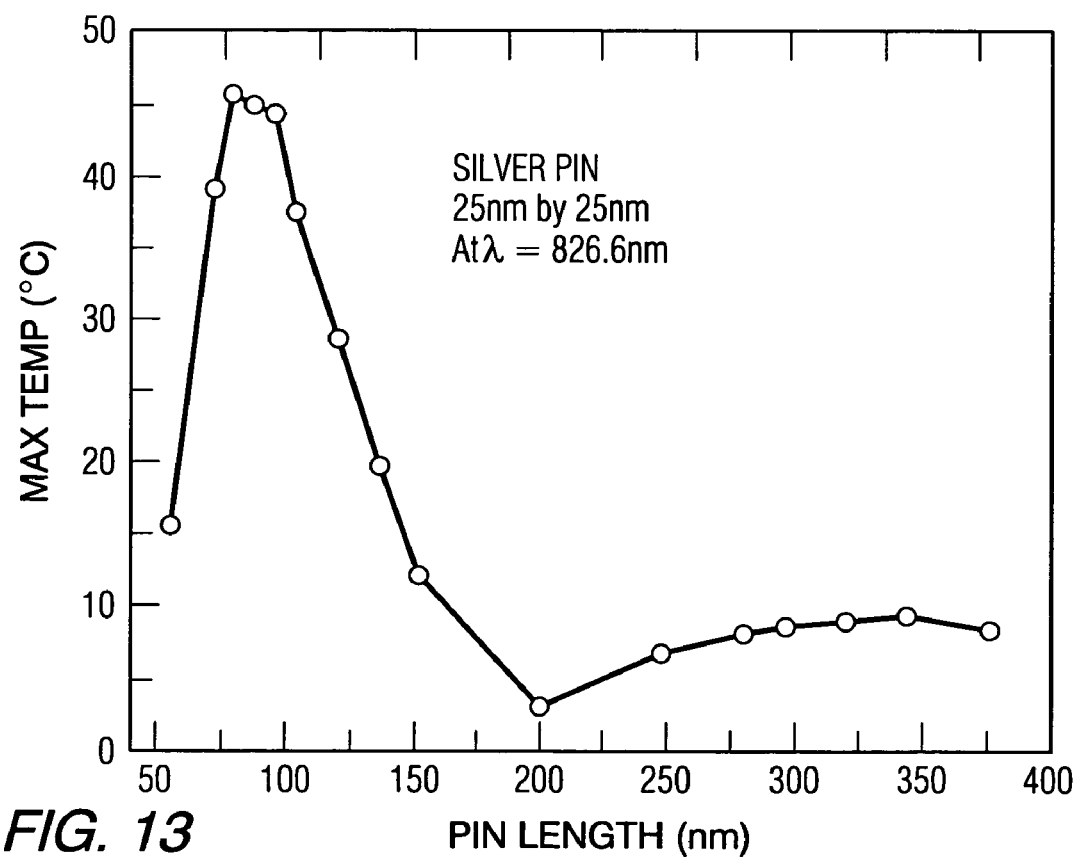

FIG. 13 shows the calculated peak temperature rise ($\Delta T$) at the surface of the continuous storage layer under illumination of a laser for 2 ns as a function of silver pin length. The optical power input to the transducer is 10 mW. In the calculation it was assumed that the storage layer is homogeneous and continuous and that the substrate is flat.

The y-component of the vector E-field is not efficiently coupled to the continuous storage layer. If the y-component of the E-field were able to couple to the storage layer as efficiently as the x and z components are able to, a temperature rise ΔT of 600° C. would be expected. For patterned media, the efficiency of coupling for the y component of the field would be much closer to that of the x and z components.

Figure 14:
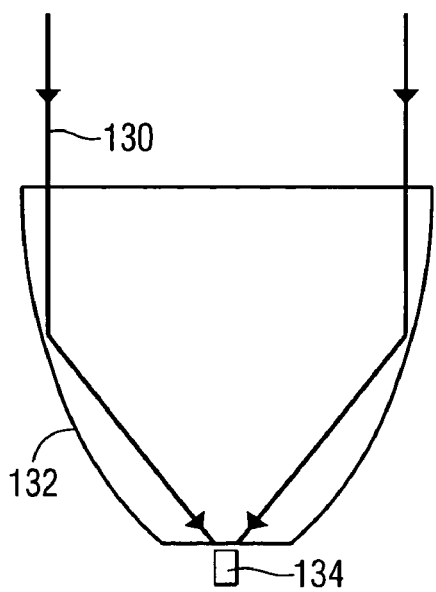
FIGS. 14, 15, 16, 17, 18 and 19 are schematic representations of transducers constructed in accordance with this invention.
Figure 15:
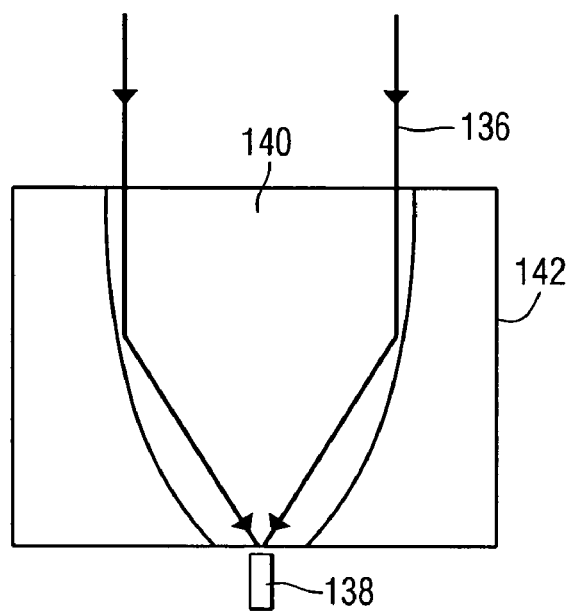
Figure 16:
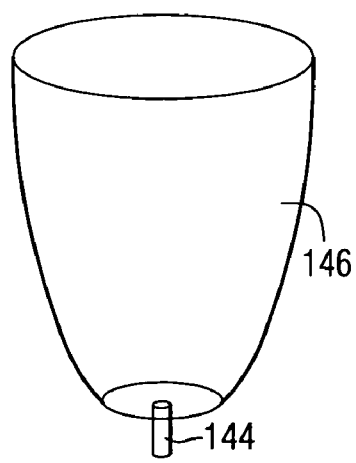

FIGS. 14, 15 and 16 are schematic representations of transducers in accordance with other implementations of the present invention. In FIG. 14, a radially polarized beam of light 130 is brought to focus on an elongated metallic pin 134 with a 3-dimensional rotational paraboloid mirror 132. Pin 134 is located at the center of focal-plane and extends below the paraboloid mirror.

In FIG. 15, a radially polarized beam of light 136 is brought to focus on an elongated metallic pin 138 using a rotational ellipsoid/paraboloid 140 embedded in a medium 142 that has lower refractive index. FIG. 16 shows a pin 144 positioned at the end of a solid immersion mirror (SIM) 146.

Figure 17:
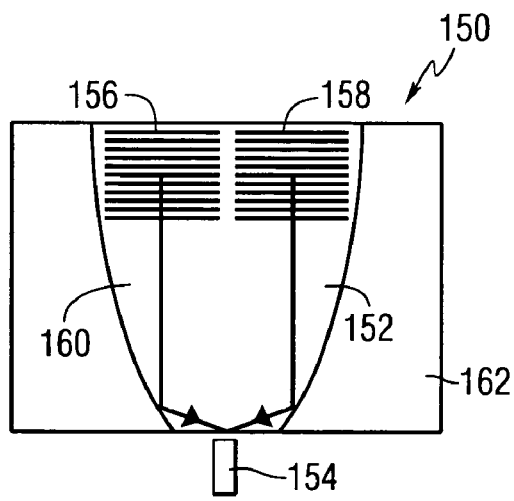
Figure 18:
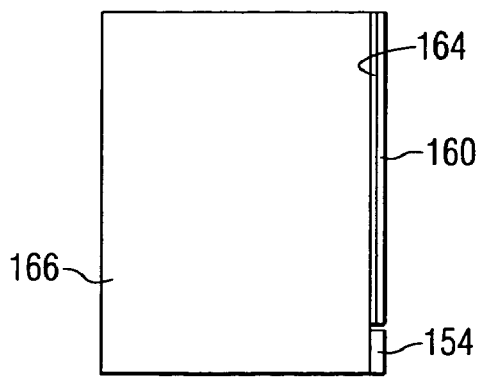
Figure 19:
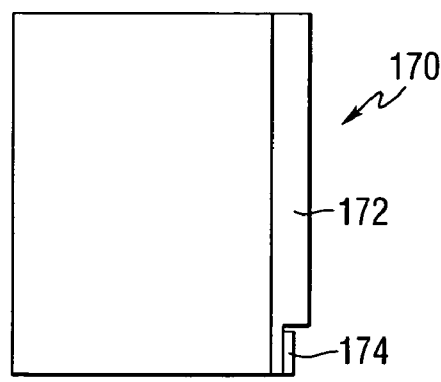

FIGS. 17, 18 and 19 are schematic representations of a transducer in accordance with additional implementations of the present invention. FIG. 17 is an end view of a transducer 150, and FIG. 18 is a side view of the transducer of FIG. 17. In FIGS. 17 and 18, the transducer 150 includes a 2-dimensional waveguide SIM 152 and a metallic pin 154. Light is coupled into one transverse electric (TE) mode of the thin-film planar waveguide with two gratings 156 and 158 that are shifted to yield a π phase difference between the light beams coupled into the waveguide. The waveguide core layer 160 has a higher refractive index than that of the surrounding medium 162 and also that of the cladding layer 164. The light coupled to the waveguide is condensed to illuminate a metallic pin 154. The π phase shift generates a split linear polarization such that at the focus, the two beams recombine to have an electric field which is parallel to the longitudinal axis of the pin. FIG. 19 is a side view of another example of the transducer 170 in which the waveguide 172 has a different thickness near the pin 174.

FIGS. 20, 21 and 22 are isometric views of micro-lens structures that can be used in the transducers of this invention. In FIG. 20, the transducer 180 comprises a 2-dimensional waveguide 182, a geodesic lens 184, and a metallic pin 186. In FIG. 21, the transducer 188 comprises a 2-dimensional waveguide 190, a mode index lens 192, and a metallic pin 194. In FIG. 20, the transducer 196 comprises a 2-dimensional waveguide 198, a diffractive lens 200, and a metallic pin 202. In each of these transducers, the light is condensed to illuminate an elongated metallic pin with the micro-lens. Dual gratings or other means of launching a dual light beam into the waveguide with a relative π phase shift can be used for ensuring a polarization at the focal point for which the electric field is directed along the axis of the pin.

In all of the examples discussed above, the pin is positioned outside of the focusing/condensing means. Three examples are illustrated in FIGS. 23, 24 and 25 to demonstrate the superiority of the present invention compared to previously proposed "pin inside" transducers. The examples of FIGS. 23, 24 and 25 each include an objective lens 210, 212 and 214 and a solid hemisphere or cap 216, 218 and 220. Near the focal point, a silver pin 222 is placed inside the hemisphere in FIG. 23. A silver pin 224 is located outside the cap in FIG. 24. A silver pin 226 is located outside the hemisphere in FIG. 25.

Figure 26:
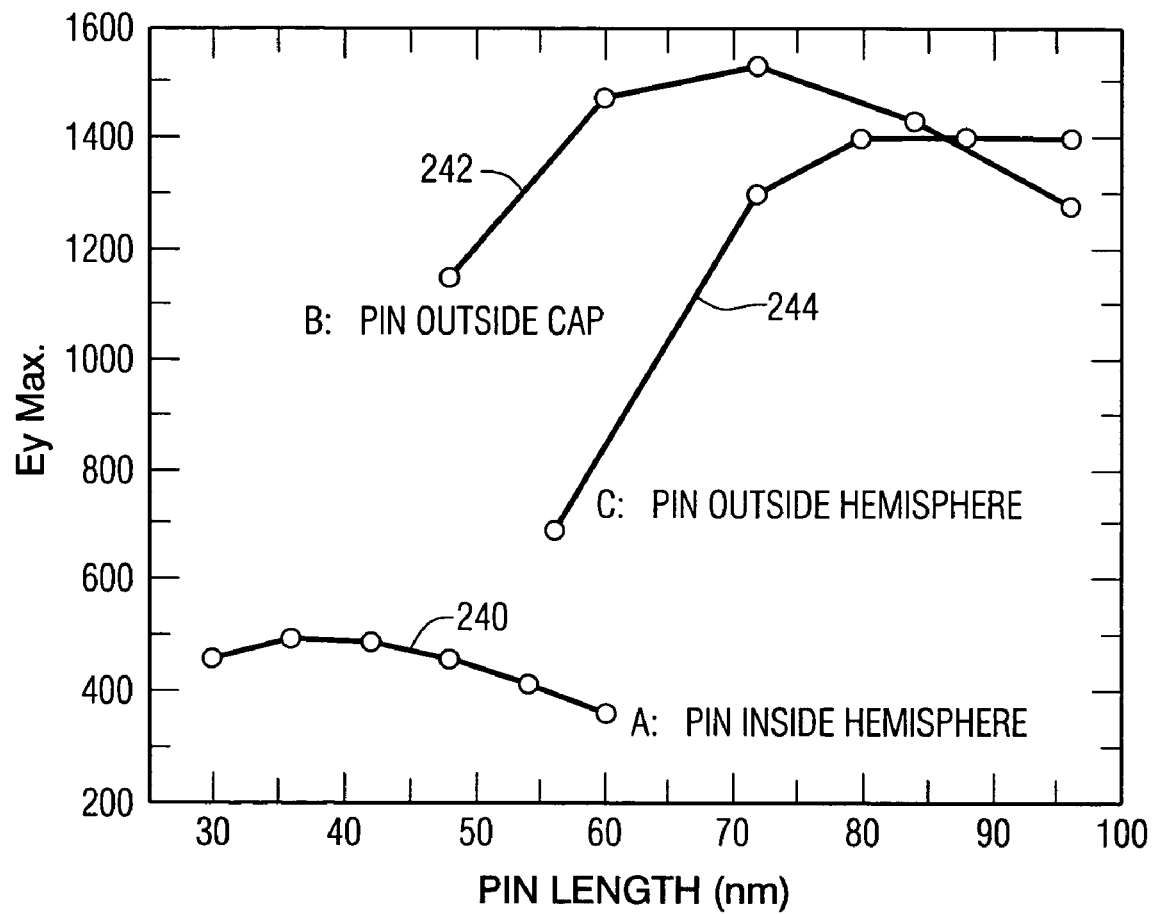
FIG. 26 is a graph of data illustrating simulated performance of the transducers of this invention.

FIG. 26 shows the calculated $E_y$ versus pin length for the transducers of FIGS. 23, 24 and 25. In each transducer, a radially polarized beam of light is focused by an objective lens onto the bottom plane of a solid hemisphere/cap. The focusing lens has a numerical aperture of 0.85, and the hemisphere/cap has a refractive index of 2.09. The wavelength is 830 nm. The E-field is evaluated at 7.5-nm below the pin. The magnitude of $E_y$ displayed has been multiplied by the light wavelength. In FIG. 24, the cap is a truncated solid immersion lens. Its width is less than the radius of the hemisphere. As a result, there are spherical aberrations in the focused spot. A storage medium 228 is positioned 10 nm away from the pin. The storage medium includes a 12 nm cobalt storage layer 230, a 100 nm gold heat-sink layer 232, and a substrate 234.

FIGS. 24 and 25 are referred to as "pin outside" transducers. The silver pin in these examples has a cross-section of 25 nm by 25 nm. For comparison, the pin length is optimized to yield maximum electric field strength in each configuration.

FIG. 26 displays the calculated results as a function of pin length. Curve 240 corresponds to the "pin inside" configuration of FIG. 23, while curves 242 and 244 correspond to the "pin outside" configuration of FIGS. 24 and 25. It is seen that the electric field varies with pin length for the three cases studied. The difference is that, in the "pin inside" configuration, the dependence of electric field on the pin length is weak, while it is pronounced in the "pin outside" configurations. The electric field is maximized at a pin length of 35 nm for the pin inside the hemisphere, at a pin length of 72 nm for the pin outside the cap, and at a pin length of 80-100 nm for a pin outside the hemisphere. Resonance is reached at a longer pin when the pin is placed outside of the SIL. At the optimized pin length, the $|E|^2$ electric field intensity with the pin outside the SIL is ~16 times greater than with the pin inside the SIL. Having a longer resonant pin length or a higher aspect ratio of the silver pin generates a higher electric field near the end of the pin.

Figure 27:
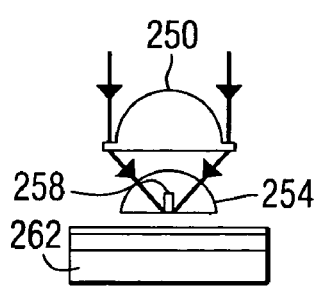
FIGS. 27 and 28 are schematic representations of transducers used to illustrate the operation of the transducers of this invention.
Figure 28:
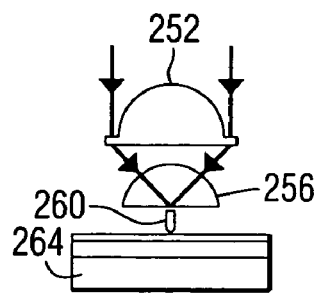
Figure 29:
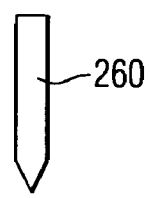
FIG. 29 is a side view of a pin used in the transducers of FIGS. 27 and 28.

FIGS. 27 and 28 show various transducer configurations used for simulation calculations. FIG. 29 shows the pin used in the transducers of FIGS. 27 and 28. A radially polarized beam of light is focused by an objective lens 250, 252 onto the bottom plane of a solid hemisphere 254, 256. The focusing lens 250, 252 has a numerical aperture of 0.85, and the hemisphere 254, 256 has a refractive index of 2.09. The wavelength is 830 nm. Near the focal point, a gold pin 258, 260 is placed inside the hemisphere in FIG. 27, or outside the hemisphere in FIG. 28. A storage medium 260, 262 is positioned 10 nm away from the pin. The gold pin 258, 260 has a cross-section of 48 nm by 48 nm with a pointed tip at the end near the storage medium. For comparison, the pin length is varied to yield maximum electric field strength in each configuration.

FIG. 30 is a graph of the magnitude of y-component of electric field versus gold pin length for a pin inside the hemisphere and a pin outside the hemisphere. The field is evaluated at 7.5 nm below the pin. The magnitude of displayed $E_y$ has been multiplied by the light wavelength.

FIG. 30 plots the calculated results as a function of pin length. Curve 270 corresponds to the "pin inside" configuration of FIG. 27, while curve 272 corresponds to the "pin outside" configuration of FIG. 28. It is seen that, with the pin outside the hemisphere, the electric field varies strongly with pin length. The electric field peaks at a pin length of 70 nm for the pin inside the hemisphere, and at a pin length of 134 nm for the pin outside the hemisphere. At the optimized pin length, the electric field strength with the pin outside is ~3 times greater than that with the inside pin. A higher aspect ratio of the pin at resonance for the outside pin causes a higher electric field near the end of the pin.

FIGS. 31A, 31B, 32A and 32B show transducer configurations for the pin inside the SIL and the pin outside the SIL. Similar to FIGS. 24, 25 and 26, a radially polarized beam of light is focused by an objective lens 280, 282 onto the bottom plane of a solid hemisphere 284, 286. The focusing lens 280, 282 has a numerical aperture of 0.85, and the hemisphere has a refractive index of 2.09. The wavelength is 830 nm. Near the focal point, a gold pin 288, 290 is placed inside the hemisphere in FIG. 31A, or outside the hemisphere in FIG. 32A. A storage medium 292, 294 is positioned 10 nm below the pin. The gold pin 288 inside the hemisphere, as shown in the FIG. 31B, is an inverted pyramid, while the pin 290 of FIG. 32B outside the hemisphere is an elongated cube with a pointed tip.

In another aspect, this invention encompasses additional plasmon enhancing pin-stack configurations to improve the transmission efficiencies of the optical transducers. In these transducers, a layer of material having a refractive index that differs from the refractive index of the surrounding material is used to increase transmission efficiency.

Coupling incident electromagnetic waves into surface plasmon modes can be used to increase the transmission efficiency of the optical transducer. Deploying radial polarization along with a pin structure excites surface plasmon modes over the metallic pin. Several configurations are described below which will enhance the surface plasmons over the metallic pin structure. By utilizing these configurations, significant improvements can be obtained in transmission efficiency without increasing the FWHM.

FIG. 33 is a schematic representation of a portion of a transducer 300 that includes a metallic pin 302 and layers 304 and 306 of a high index dielectric material positioned on opposite sides of the pin. Electromagnetic waves 308 and 310 which are 180° out of phase with each other are directed onto the pin to create surface plasmon modes on the surfaces of the pin. This concentrates the electric field at the end 312 of the pin to heat a data storage medium 314. The data storage medium includes a magnetic recording layer 316, a heat sink layer 318 and a substrate 320. In this example, the pin 302 and layers 304 and 306 are positioned in air, and the refractive index of the layers 304 and 306 is greater than that of air. This structure will be referred to as LHM (low index dielectric—high index dielectric—metallic pin) structure.

FIG. 34 is schematic representation of a portion of a transducer 330 that includes a metallic pin 332 and layers 334 and 336 of a low index dielectric material positioned on opposite sides of the pin. Electromagnetic waves 338 and 340 which are 180° out of phase with each other are directed onto the pin to create surface plasmon modes on the surfaces of the pin. This concentrates the electric field at the end 342 of the pin to heat a data storage medium 344. The data storage medium includes a magnetic recording layer 346, a heat sink layer 348 and a substrate 350. In this example, the pin 332 and layers 334 and 336 are positioned in high dielectric material waveguide 352, and the refractive index of the layers 334 and 336 is less than that of the waveguide 352. This structure will be referred to as HLM (high index dielectric—low index dielectric—metallic pin) structure.

FIG. 35 is a graph of the dissipated power density on the top surface of the storage medium for the structures of FIGS. 33 and 34. In FIG. 35, line 366 represents the dissipated power in the surface of the medium for a pin embedded in a high index waveguide, without any cladding material. Line 364 represents the dissipated power in the surface of the media for a pin placed at the focus of a lens system. Line 360 represents the dissipated power in the surface of the media for a HLM structure. Line 362 represents the dissipated power in the surface of the media for a LHM structure. The data in FIG. 35 suggests that the configurations of FIGS. 33 and 34 improve transmission efficiencies.

The pins and surrounding structures of FIGS. 33 and 34 assumed cylindrical pins. For planar structures, rectangular pins may be more appropriate. In this case, the surrounding dielectrics can be either rectangular prisms or planar surfaces. The later configurations can accommodate magnetic recording poles in a heat assisted magnetic recording system.

Figure 36:
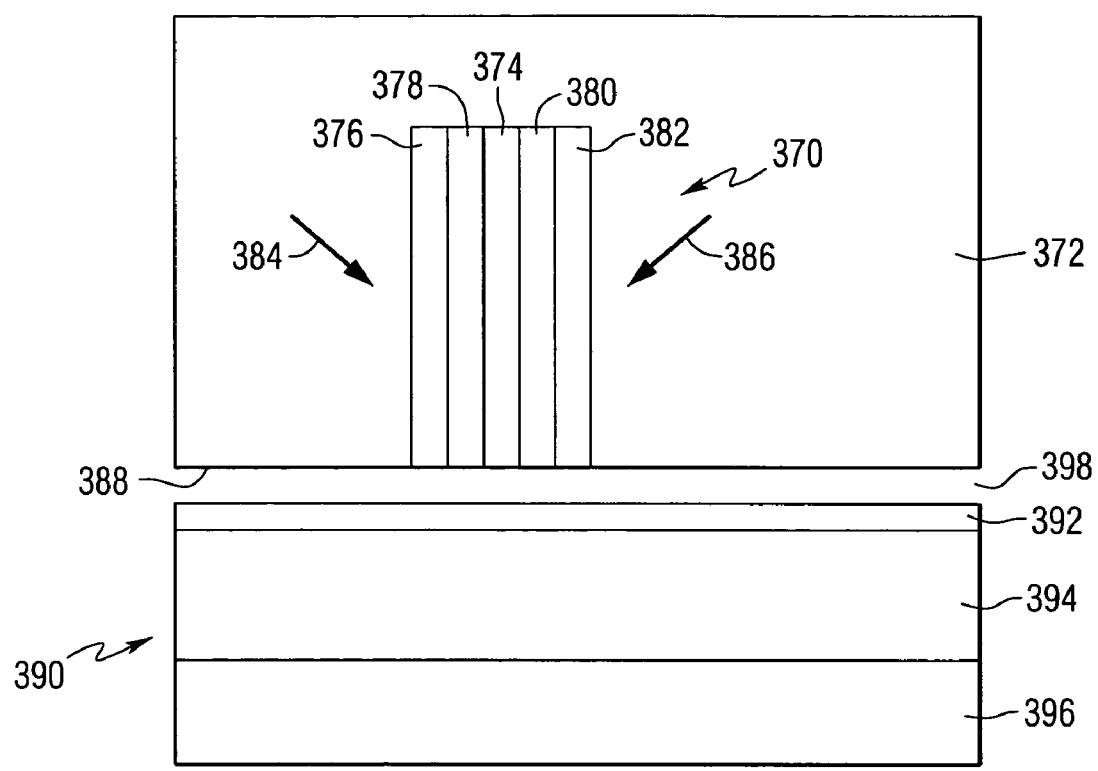
FIGS. 36 through 43 are schematic representations of portions of transducers constructed in accordance with the invention.

In an alternative example, a more complex multilayer structure such as the one in FIG. 36 can be used. In FIG. 36, a multilayer structure 370 can be embedded in a low or high refractive index material 372. The multilayer structure can be viewed in two ways. If used in a cylindrically symmetric optical system, such as a SIL, the layers can be half concentric cylindrical layers. Alternatively, the layers can be planar surfaces with different optical properties. The multilayer structure 370 includes a pin 374 and several layers 376, 378, 380 and 382 positioned on opposite sides of the pin as shown in FIG. 36. Linearly polarized or radially polarized light as indicated by arrows 384 and 386 is directed to illuminate the multilayer structure to create surface plasmons on the pin. An air bearing surface 388 of the transducer is positioned adjacent to a storage medium 390. The storage medium includes a cobalt recording layer 392, a heat sink layer 394 and a substrate 396. The air bearing surface of the transducer is separated from the storage medium by a gap 398.

The width and length of the pin and the dielectric materials can be adjusted for optimum performance. In addition, the electrical properties of the dielectric materials can be optimized. Also, the metal used for the pin can be selected to enhance excitation of surface plasmons.

Figure 37:
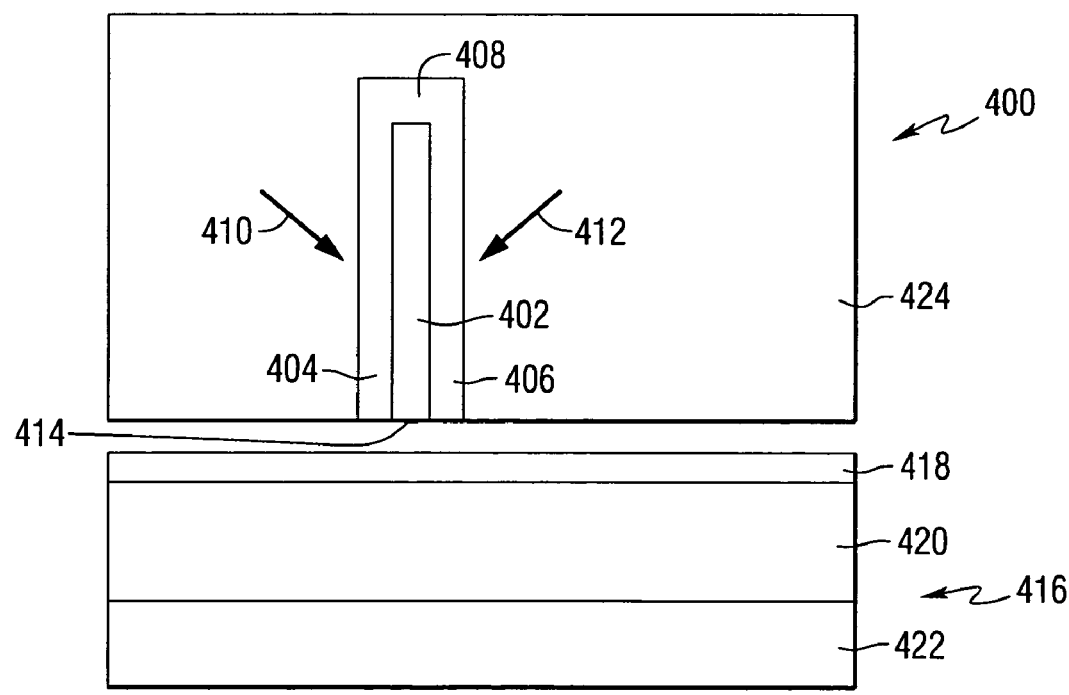

In FIGS. 33 and 34, the metallic pin is covered on the sides only. However, in an alternative example, the pin can be embedded in the dielectric material as shown in FIG. 37. The transducer 400 of FIG. 37 includes a metallic pin 402 and layers 404 and 406 of a low index dielectric material positioned on opposite sides of the pin. An additional layer 408 of dielectric material is positioned at the end of the pin. Electromagnetic waves 410 and 412 which are 180° out of phase with each other are directed onto the pin to create surface plasmons modes on the surfaces of the pin. This concentrates the electric field at the end 414 of the pin to heat a data storage medium 416. The data storage medium includes a magnetic recording layer 418, a heat sink layer 420 and a substrate 422. In this example, the pin 402 and layers 404, 406 and 408 are positioned in a dielectric material waveguide 424 having a high refractive index, and the refractive index of the layers 404, 406 and 408 is less than that of the waveguide 424.

Figure 38:
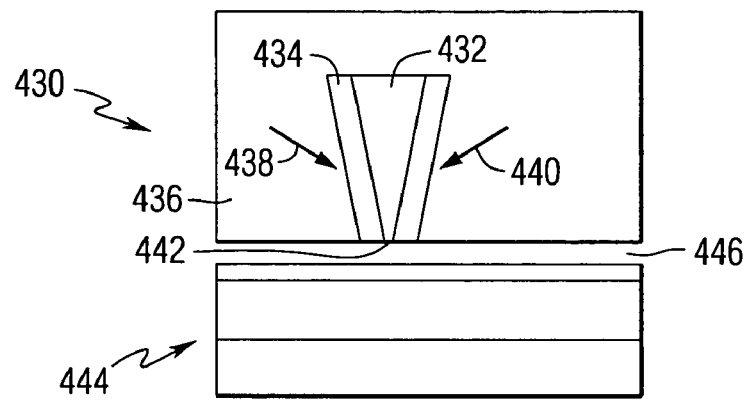

FIG. 38 illustrates a transducer 430 that includes a conical pin structure. In the transducer of FIG. 38, a conical pin 432 is surrounded by a dielectric cladding material 434 having a low index of refraction. The pin structure is embedded in a high index dielectric material 436. Radially polarized light indicated by arrows 438 and 440 is directed onto the sides of the pin structure to excite plasmons on the surface of the pin. An end 442 of the pin is positioned adjacent to the storage medium 444, and separated from the storage medium by a gap 446.

Figures 39, 40:
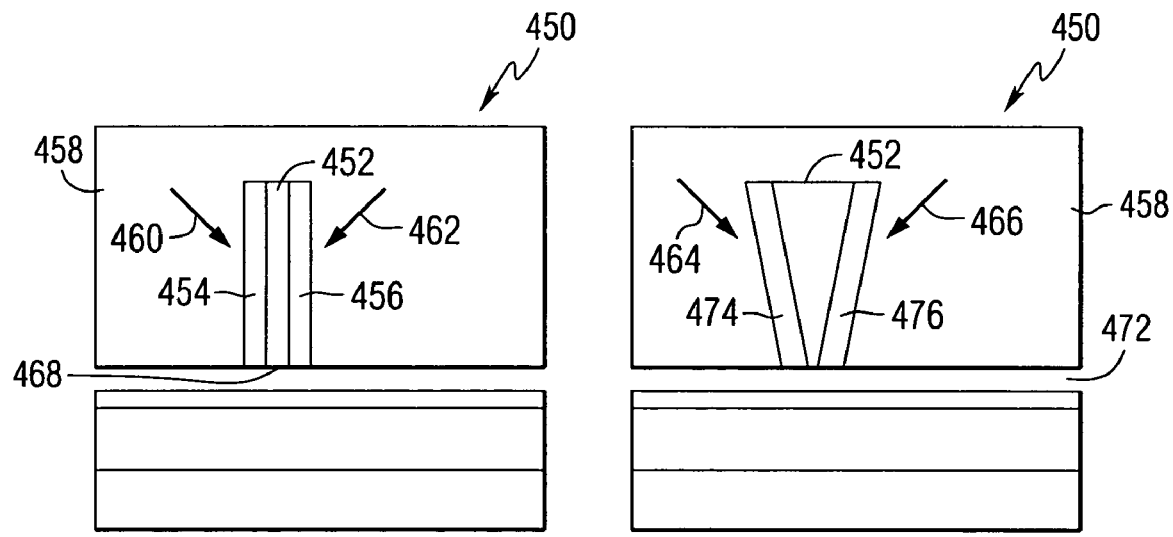

FIGS. 39 and 40 are front and side views of a transducer 450 that includes a planar triangular pin structure. In the transducer of FIGS. 39 and 40, a planar triangular pin 452 is positioned between dielectric cladding layers 454, 456, 474 and 476 having a low index of refraction. The pin structure is embedded in a high index dielectric material 458. Radially polarized light indicated by arrows 460, 462, 464 and 466 is directed onto the sides of the pin structure to excite plasmons on the surface of the pin. An end 468 of the pin is positioned adjacent to the storage medium 470, and separated from the storage medium by a gap 472.

Figure 41:
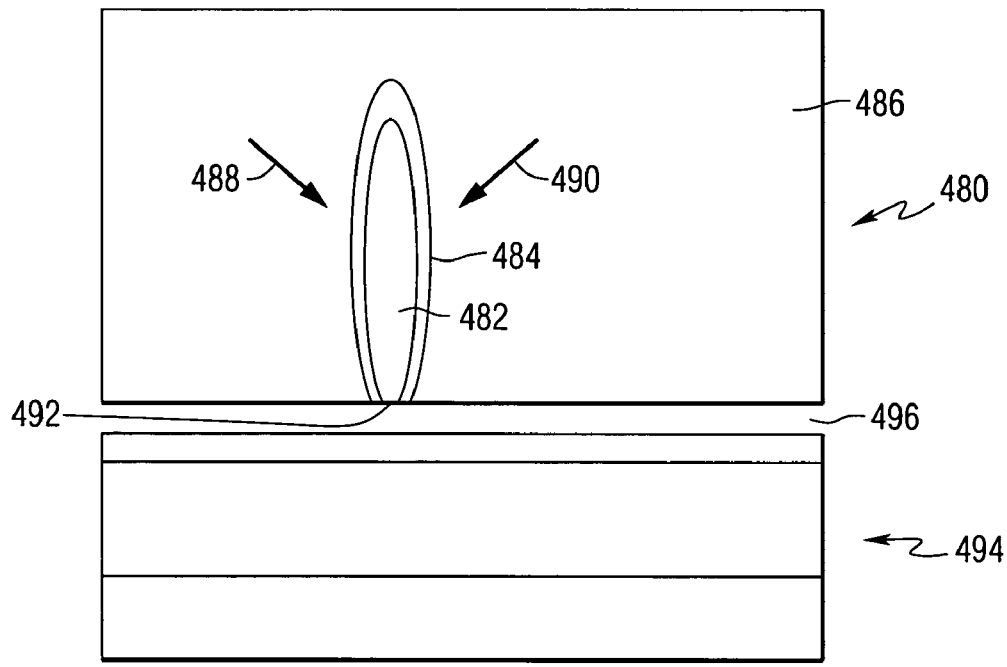

FIG. 41 illustrates a transducer 480 that includes an elliptical pin structure. In the transducer of FIG. 41, an elliptical pin 482 is surrounded by a dielectric cladding material 484 having a low index of refraction. The pin structure is embedded in a high index dielectric material 486. Radially polarized light indicated by arrows 488 and 490 is directed onto the sides of the pin structure to excite plasmons on the surface of the pin. An end 492 of the pin is positioned adjacent to the storage medium 494, and separated from the storage medium by a gap 496.

Figure 42:
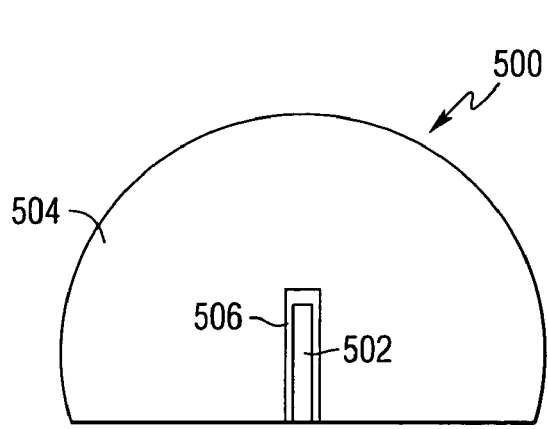

FIG. 42 is a schematic representation of a transducer 500 having a metallic pin 502 embedded in a solid immersion lens 504. A low index dielectric cladding 506 surrounds the pin. The solid immersion lens serves as a means for directing radially polarized light onto the pin.

Although the examples of FIGS. 38, 39, 40 and 41 used radial polarization, these transducers will provide enhancement for other polarizations as well. In addition, the operating frequency can be optimized for enhanced transmission.

Figure 43:
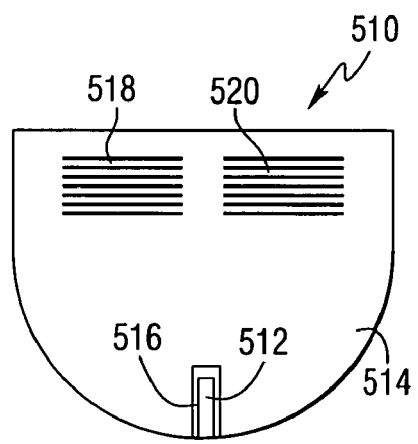

FIG. 43 is a schematic representation of a transducer 510 having a metallic pin 512 embedded in a planar waveguide 514. A low index dielectric cladding 516 surrounds the pin. Gratings 518 and 520 serve to couple light into the waveguide. The gratings are offset to produce split linearly polarized light in the waveguide. The planar waveguide lens serves as a means for directing split linearly polarized light onto the pin.

In order to accommodate a magnetic recording pole in the vicinity of the optical transducer, rectangular prism-shaped pin structures may be preferred for some applications such as heat-assisted magnetic recording. For such structures, different thicknesses and materials for the dielectrics can be used to improve the performance of the optical transducer in the vicinity of the magnetic recording pole. Magnetic structures can be elongated in one direction and coated with dielectrics to improve transmission efficiencies.

The transducers of this invention increase transmission efficiencies. The structures increase transmission efficiency by enhancing plasmon modes on the metallic pin. Therefore, the FWHM spot size is determined by the radius of the metallic pin, not by the thickness and index of the adjacent dielectrics. To illustrate this point, normalized power distributions are illustrated in FIG. 44. The data suggests that the FWHM spot size remains the same for these configurations. Minor fluctuations in the plots are due to the different discretizations used by the finite element modeling technique.

The thickness of the layers is among the parameters that need to be optimized for enhanced performance. FIGS. 45 and 46 show the performance as a function of thickness. For the calculations, the pin structure was assumed to have a radius of 10 nm and the maximum dissipation power density in the media was calculated as a function of the dielectric layer thickness. FIG. 45 represents data for a gold pin with $SiO_2$ dielectric cladding in air. For this configuration, the optimum dielectric thickness was computed as 6 nm. FIG. 46 represents data for a gold pin with an air dielectric layer mounted in a $SiO_2$ material. For this configuration, the optimum dielectric thickness was computed as 14 nm.

The various illustrated pinstack structures can be integrated with the previous optical transducers to improve the efficiencies without affecting the FWHM sizes. The pinstack structures are efficient configurations to couple the electromagnetic (EM) fields into the metal pin. The pinstack structures can be seen as analogous to Kretschmann and Otto surface plasmon launching techniques for infinite planar surfaces. Total internal reflection phenomena and high index-low index boundaries can be utilized to create evanescent waves around the boundaries, which increases the transmission efficiency due to surface plasmon enhancement. Better matching of the surface impedance can be another possible contributor to the enhanced transmission. By using a dielectric layer, wave impedance of the surface plasmon modes are changing, hence resulting in a better match to the incident EM wave.

This invention provides a near-field optical transducer that includes an optical element for condensing an electromagnetic wave to a focal region, and an elongated metallic nano-structure. In one aspect of the invention, the nano-structure can be positioned in the region directly adjacent to but outside of the focal plane created by the condensing element. The long axis of the nano-structure is parallel to the direction of light propagation. The source of light is focused onto a region near one end of the nano-structure by the optical element. The focused beam for illuminating the nano-structure has a mode profile such that its electric field is substantially parallel to the long axis of the nano-structure. The transducer confines the light and enhances the electric field at the other end of the nano-structure. For data storage, the transducer is brought in a close proximity to the storage layer. In this aspect of the invention, the transducer differs from the prior systems in that the metallic nano-structure is outside of the condenser in a lower index medium rather than embedded in a high index dielectric material or in a focusing optical element. This yields improved electric field enhancement and can deliver large amount of optical power to patterned storage media.

In another aspect, the invention provides transducers including means for directing an electromagnetic wave onto a metallic pin, with one or more dielectric cladding layers positioned adjacent to the pin. The cladding layers have an index of refraction that differs from the index of refraction of the surrounding material. This increases the amount of energy that can be delivered to a storage medium from the end of the pin.

The waveguide can be made of, for example, a high index dielectric core material like $TiO_2$, $Ta_2O_5$, Si, SiN, or ZnS depending on the wavelength and refractive index desired. For example, Si has a very large index of 3.5 at a wavelength of 1550 nm in the near infrared, but it is not transparent to visible light. $Ta_2O_5$ has a lower index of about 2.1, but is transparent throughout the near infrared and visible. The waveguide also contains dielectric cladding layers on either side of the core. The cladding layer must have a lower refractive index than the core layer. Preferably the difference in refractive index between the core and cladding should be as large as possible. Air is a suitable dielectric for one side of the cladding. Other dielectrics that could be used as cladding layers include $SiO_2$ with an index of 1.5 and $Al_2O_3$ with an index of about 1.8.

When the invention is used with a transverse electric (TE) mode electromagnetic wave, means can be provided to phase shift a portion of the electromagnetic wave. This phase shift can be achieved by providing a means for launching the 2-dimensional analog of a radially polarized wave into the planar waveguide. This is referred to above as a split linear polarization waveguide mode.

Figure 47:
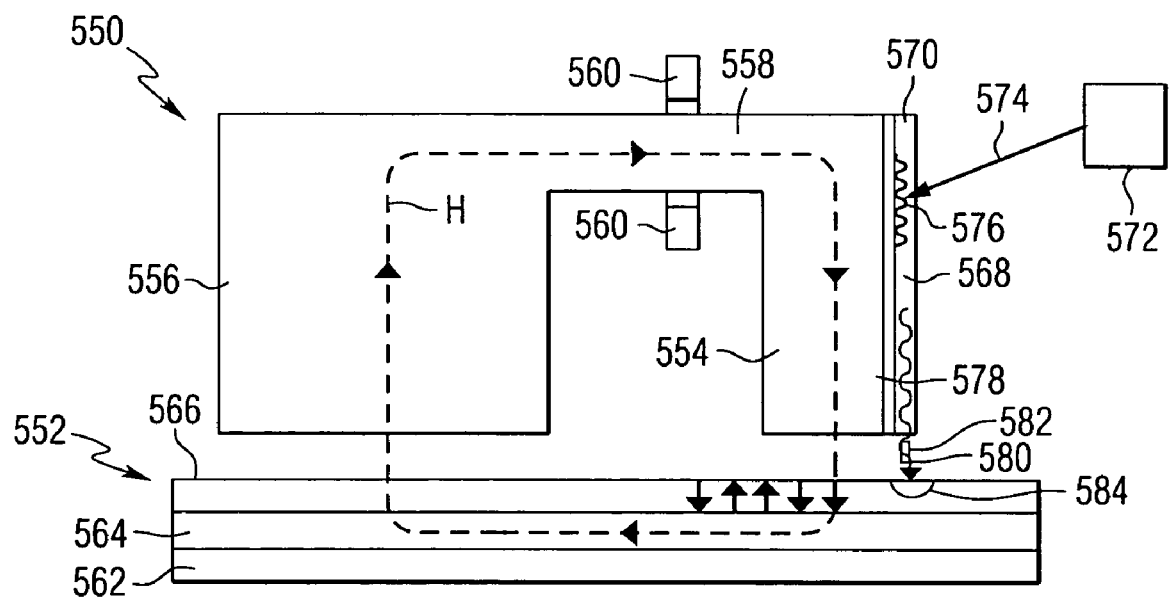
FIG. 47 is a schematic representation of a magneto-optic recording head constructed in accordance with this invention.

In another aspect, this invention encompasses magnetic recording heads that include the above described transducers. FIG. 47 is a schematic representation of a magneto-optical recording head 550 constructed in accordance with this invention. The recording head 550 is positioned adjacent to a magnetic recording medium 552. Although an embodiment of the invention is described herein with reference to recording head 550 as a perpendicular magnetic recording head and the medium 552 as a perpendicular magnetic recording medium, it will be appreciated that aspects of the invention may also be used in conjunction with other types of recording heads and/or recording mediums where it may be desirable to employ heat assisted recording. Specifically, the recording head 550 may include a writer section comprising a main write pole 554 and a return or opposing pole 556 that are magnetically coupled by a yoke or pedestal 558. It will be appreciated that the recording head 550 may be constructed with a write pole 554 only and no return pole 556 or yoke 558. A magnetization coil 560 surrounds the yoke or pedestal 558 for energizing the recording head 550. The recording head 550 also may include a read head, not shown, which may be any conventional type read head as is generally known in the art. The waveguide can alternatively be positioned on the other side of the pole. In another example, the pin and the pole can be the same material, in which case the pin can function as both the electromagnetic transducer and the source of the field.

Still referring to FIG. 47, the recording medium 552 is positioned adjacent to or under the recording head 550. The recording medium 552 includes a substrate 562, which may be made of any suitable material such as ceramic glass or amorphous glass. A heat sink layer and/or a soft magnetic underlayer 564 may be deposited on the substrate 562. The soft magnetic underlayer 564 may be made of any suitable material such as, for example, alloys or multilayers having Co, Fe, Ni, Pd, Pt or Ru. The heat sink layer may be made of any suitable layer such as Au, Ag, Cu or Al. A hard magnetic recording layer 566 is deposited on the soft underlayer 564, with substantially perpendicular oriented magnetic domains contained in the hard layer 566. Suitable hard magnetic materials for the hard magnetic recording layer 566 may include at least one material selected from, for example, FePt or CoCrPt alloys having a relatively high anisotropy at ambient temperature.

The recording head 550 also includes a planar waveguide 568 that directs light received from a light source onto a surface of a recording medium to heat the magnetic recording medium 552 proximate to where the write pole 554 applies the magnetic write field H to the recording medium 552. The planar waveguide includes a light transmitting layer 570. The optical waveguide 568 acts in association with a light source 572 which transmits light, for example via an optical fiber 574, that is coupled to the optical waveguide 568, by a coupling means such as a grating 576. The light source 572 may be, for example, a laser diode, or other suitable laser light sources. This provides for the generation of a light guided mode that may propagate through the optical waveguide 568 toward the recording medium. EM radiation, generally designated by reference number 580, is transmitted from a pin 582 for heating the recording medium 552, and particularly for heating a localized area 584 of the recording layer 566.

In heat assisted magnetic recording, the transducer is used to heat a portion of the storage medium and the heated portion of the storage medium is subjected to a magnetic field to affect the magnetization of a storage layer in the storage medium. The magneto-optical recording head can also include a reader as is well-known in the art.

The optical waveguide 568 can be constructed in accordance with any of the waveguides described above. The waveguides of this invention can also be used in optical recording applications in which either a magnetic field is not needed, such as write once and phase change recording, or where an external magnet could be positioned below the substrate, such as in magneto-optic recording. Alternatively, these structures could potentially be useful in a probe storage application or for high resolution near field optical lithography or for high resolution near field microscopy.

The transducers of this invention utilize pins which are dimensioned such that plasmon modes at the pins result from collective oscillations of electrons. This is also referred to as dipole plasmon resonance of the pins. The pin structures described in the examples have dimensions of a few hundred nanometers or less. Therefore, they can be described as nanoparticles or nano-structures. This resonance includes the geometric effects due to the shape and size of the pins. It is generally desirable for the metallic pins to have an aspect ratio (length to width) of 2:1 or greater. However, optimization of the aspect ratio of the pin depends on various factors, such as shape, material, dielectric index of the surrounding medium, and wavelength. The aspect ratio of a cylinder is the ratio of the height of the cylinder to the diameter of the cylinder. The aspect ratio of a rectangular pin is the ratio of the height of the pin to the width of the pin. For a spheroid, the aspect ration is the ratio of the length of the major axis to the length of the minor axis.

While the invention has been described in terms of several examples, it will be apparent to those skilled in the art that various changes can be made to the disclosed examples, without departing from the scope of the invention as set forth in the following claims.

What is claimed is:

1. An optical transducer comprising:
an optical element for directing an electromagnetic wave to a focal region; and
a metallic nano-structure having a longitudinal axis substantially parallel to an electric field of the electromagnetic wave, the metallic nano-structure being positioned outside of the optical element and separated from the optical element by a gap, wherein the electromagnetic wave produces surface plasmons on the metallic nano-structure.

2. The optical transducer of claim 1, wherein the metallic nano-structure is evanescently coupled to the electromagnetic wave adjacent to an end of the optical element.

3. The optical transducer of claim 1, wherein:
the optical element has a first refractive index; and
the metallic nano-structure is surrounded by a material having a second refractive index, with the second refractive index being lower than the first refractive index.

4. The optical transducer of claim 1, wherein the gap has a width of less than 50 nm.

5. The optical transducer of claim 1, wherein the nano-structure comprises a metallic pin having an aspect ratio greater than or equal to 2:1.

6. The optical transducer of claim 1, wherein the nano-structure comprises a pin having a pointed tip.

7. The optical transducer of claim 1, wherein the nano-structure is dimensioned for resonant coupling of energy into a recording medium.

8. The optical transducer of claim 1, wherein the optical element comprises one of: a solid immersion lens, a solid immersion mirror, or a planar waveguide.

9. The optical transducer of claim 1, wherein the electromagnetic wave comprises one of: radially polarized light or split linearly polarized light.

10. A magneto-optical recording head comprising:
a magnetic write pole; and
the optical transducer of claim 1 positioned adjacent to the magnetic write pole.

11. A disc drive comprising:
a storage medium;
the magneto-optical recording head of claim 10; and
an arm for positioning the magneto-optical recording head adjacent to the storage medium.

12. An optical transducer comprising:
an optical element having a focal region and a first index of refraction; the means
a metallic nano-structure embedded in the optical element at the focal region; and
a cladding material having a second index of refractive positioned between the optical element and the metallic nano-structure, and separating the metallic nano-structure from the optical element.

13. The optical transducer of claim 12, wherein the metallic nano-structure is dimensioned to resonantly couple to the electromagnetic wave in the presence of a recording medium.

14. The optical transducer of claim 12, wherein:
the thickness of the cladding material is less than the thickness of the metallic nano-structure.

15. The optical transducer of claim 12, wherein:
the difference between the first and second refractive indexes is greater than about 0.5.

16. The optical transducer of claim 12, wherein:
the thickness of the cladding material is tapered along a surface of the metallic nano-structure.

17. The optical transducer of claim 12, wherein:
the second refractive index is lower than the first refractive index.

18. An optical transducer comprising:
an optical element having a focal region and a first index of refraction;
a metallic nano-structure positioned in the optical element at the focal region; and
a cladding material having a second index of refraction positioned between the optical element and the metallic nano-structure;
wherein the second index of refraction is greater than the first index of refraction.

19. The optical transducer of claim 12, wherein the optical element comprises one of: a solid immersion lens, a solid immersion mirror, or a planar waveguide.

20. The optical transducer of claim 12, wherein electromagnetic wave comprises one of: radially polarized light or split linearly polarized light.

21. A magneto-optical recording head comprising:
a magnetic write pole;
the optical transducer of claim 12 positioned adjacent to the magnetic write pole; and
a polarizer for polarizing the electromagnetic wave.

22. A disc drive comprising:
a storage medium;
the magneto-optical recording head of claim 21; and
an arm for positioning the magneto-optical recording head adjacent to the storage medium.

* * * * *

UNITED STATES PATENT AND TRADEMARK OFFICE
CERTIFICATE OF CORRECTION

PATENT NO. : 7,330,404 B2 Page 1 of 1
APPLICATION NO. : 10/683385
DATED : February 12, 2008
INVENTOR(S) : Chubing Peng, William Albert Challener and Ibrahim Kursat Sendur It is certified that error appears in the above-identified patent and that said Letters Patent is hereby corrected as shown below:

In the Claims

Column 15, Lines 21 (Claim 12)
After ...of refraction,... delete "the means"

Column 15, Lines 24 (Claim 12)
After ...index of... delete "refractive" and insert --refraction--

Column 16, Line 22 (Claim 20)
After ...wherein... insert --the--

Signed and Sealed this

Twenty-ninth Day of July, 2008

JON W. DUDAS
*Director of the United States Patent and Trademark Office*